United States Patent [19]
Taneichi

[11] Patent Number: 6,007,284
[45] Date of Patent: Dec. 28, 1999

[54] NUT AND CONNECTOR

[76] Inventor: Kaoru Taneichi, 463-11 Aikoh, Atsugi-shi, Kanagawa-ken, Japan

[21] Appl. No.: 09/167,135

[22] Filed: Oct. 6, 1998

[30] Foreign Application Priority Data

Apr. 7, 1998 [JP] Japan .................................. 10-112685

[51] Int. Cl.⁶ ............................. F16B 37/08; F16B 39/36
[52] U.S. Cl. ........................ 411/267; 411/270; 411/400; 411/433
[58] Field of Search .................................. 411/267, 270, 411/383, 396, 400, 433

[56] References Cited

U.S. PATENT DOCUMENTS

| | | | |
|---|---|---|---|
| 2,814,324 | 11/1957 | Shur ........................................ | 411/267 |
| 3,075,622 | 1/1963 | Attwood .............................. | 411/400 X |
| 3,151,652 | 10/1964 | Zahodiakin ........................ | 411/270 X |
| 3,157,215 | 11/1964 | Zahodiakin ........................ | 411/270 X |
| 4,197,783 | 4/1980 | Lankelot, III et al. ................. | 411/396 |
| 4,378,187 | 3/1983 | Fullerton ................................. | 411/267 |
| 5,468,105 | 11/1995 | Iwamoto ................................. | 411/433 |

Primary Examiner—Neill Wilson
Attorney, Agent, or Firm—Jordan and Hamburg LLP

[57] ABSTRACT

A nut for slidable application to a bolt has a nut body with a first end, a second end, and a through hole. The nut body has an outer wall formed in the and an inner wall defining the through hole including at least a portion thereof being an inclined wall hole having a diameter decreasing from a first diameter to a second diameter proximate the second end. A stop flange extends radially inward into the through hole at the first end of the nut body and defines a bolt exit aperture. Three guideposts are formed coaxially on the inner wall of the inclined wall hole. Three nut segments have inclined outer surfaces complementing an inclination angle of the inner wall of the inclined wall hole and inner surfaces with threads. The three nut segments are movably disposed between the guideposts so as to permit sliding movement in an axial direction and radial displacement urged by sliding engagement of the inclined outer surfaces with the inner wall of the inclined wall hole. A flange is disposed at the second end of the nut body and extends inward of the second diameter to define a bolt insertion aperture, through which the bolt passes during application of the nut body to the bolt, and thereby retains the nut segments between the guide posts. A spring is disposed between the stop flange and the nut segments to bias the nut segments toward the second end of the nut body.

17 Claims, 24 Drawing Sheets

NUT AND CONNECTOR

BACKGROUND OF THE INVENTION

The present invention relates to a nut which is screwed into a battledore-shaped bolt used where a connection between a beam and another beam in a wooden house is reinforced, or a nut and connector which are used to reinforce a connection between the beam and the other beam.

When a connection between a beam and another beam in a wooden house is reinforced using the conventional method, a head of a battledore-shaped bolt is fixed to one beam, a top end portion of the battledore-shaped bolt is inserted into a bolt insertion hole which is formed at the other beam, and a nut is fixed and screwed onto the bolt which is passed through a washer.

In the above-mentioned structure, the nut screwed onto the bolt is released from timber material and does not function when timber material dries and contracts.

Additionally, it is troublesome to fit the battledore-shaped bolt to the nut because the nut is screwed onto the bolt to a fixed position.

SUMMARY OF THE INVENTION

In view of the foregoing, it is an object of the present invention to provide a nut and connector which can be pushed onto a thread portion of a bolt and be positioned in a manner which requires little work to screw onto a bolt.

It is another object of the present invention to provide a nut and connector wherein the nut can be sufficiently screwed onto a bolt when a size of a thread portion is small.

The above and further objects and novel features of the invention will more fully appear from the following detailed description when the same is read in connection with the accompanying drawings. It is to be understood that these are for the purpose of illustration only and are not intended to be a definition of the limits of the invention.

DETAILED DESCRIPTION

Preferred embodiments of the present invention will now be described in detail below referring to the accompanying drawings.

Figure 1:
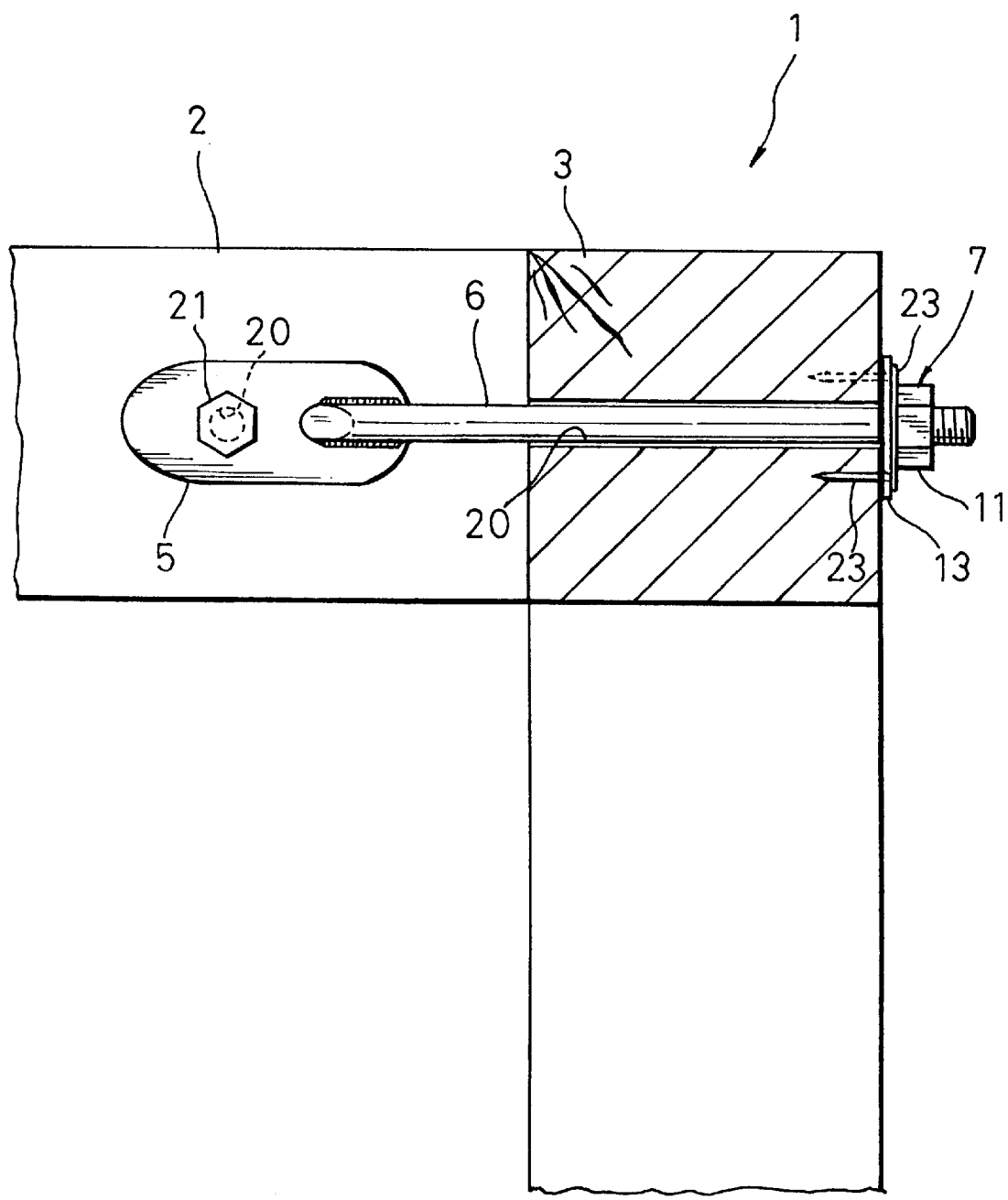
FIG. 1 is a front view showing a first embodiment of the present invention in use.
Figure 2:
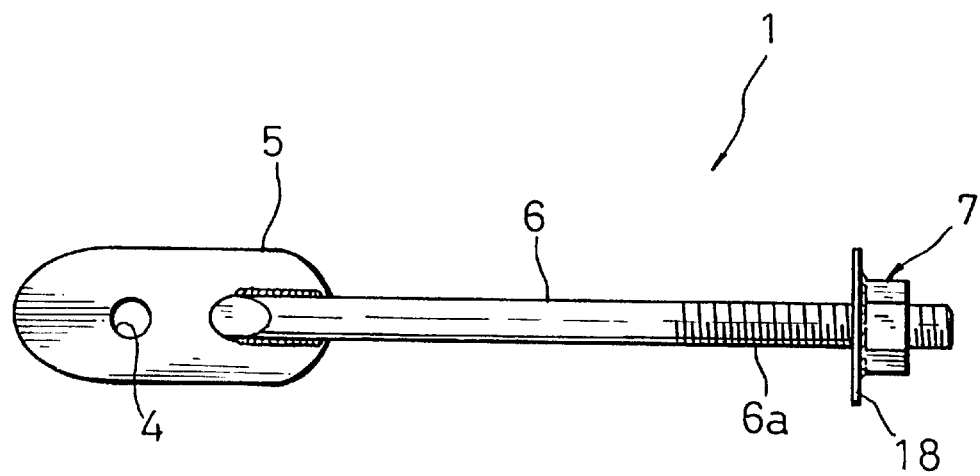
FIG. 2 is a front view showing the first embodiment of the present invention.
Figure 3:
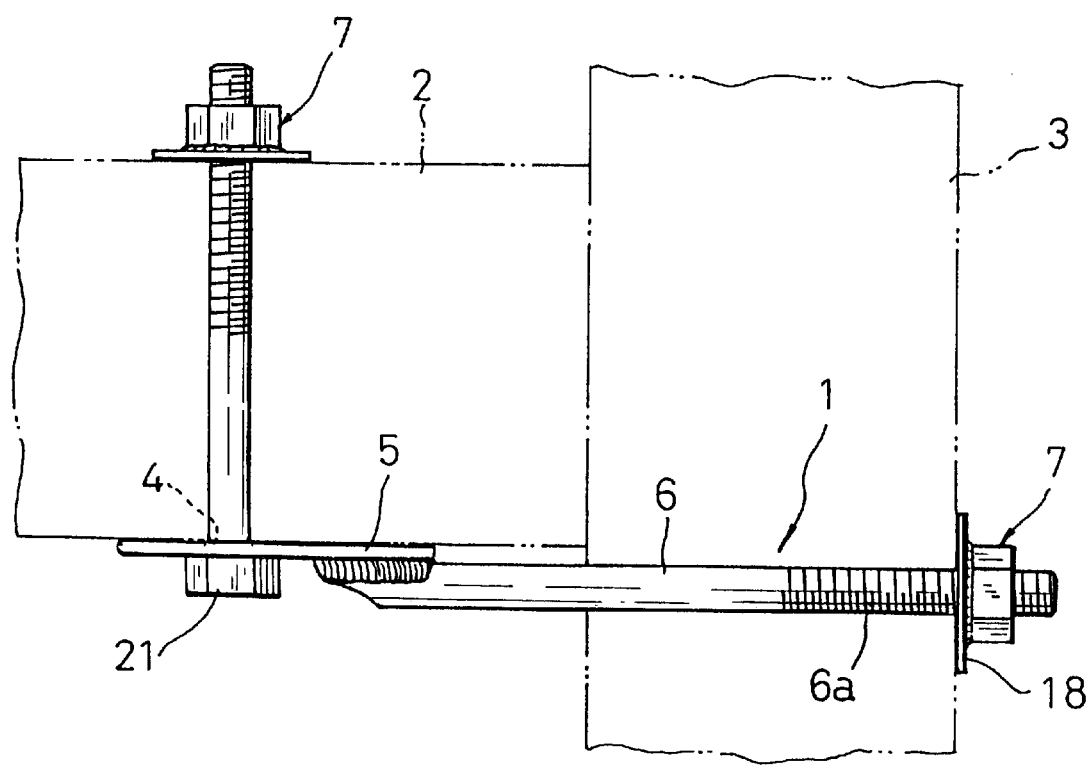
FIG. 3 is a top view showing the first embodiment of the present invention.
Figure 4:
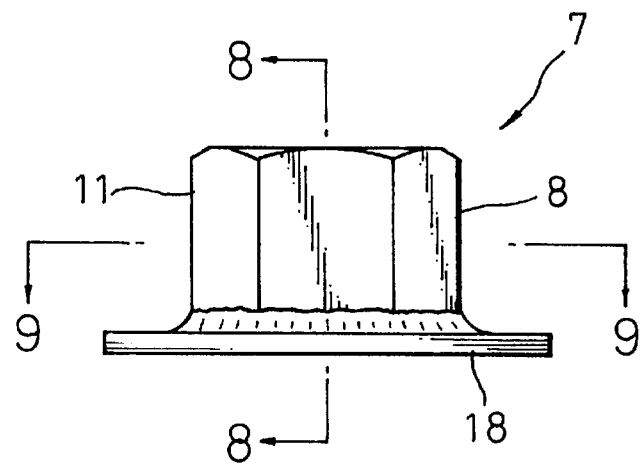
FIG. 4 is a front view of a nut showing the first embodiment of the present invention.
Figure 5:
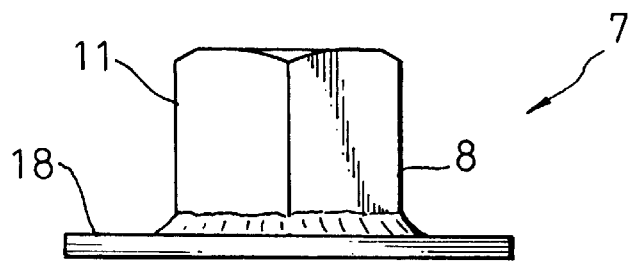
FIG. 5 is a top view of a nut showing the first embodiment of the present invention.
Figure 6:
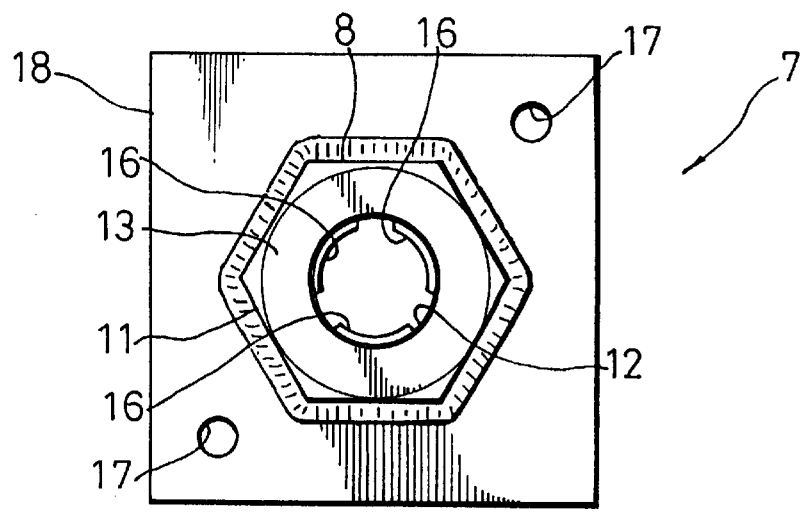
FIG. 6 is a side view of a nut showing the first embodiment of the present invention.
Figure 7:
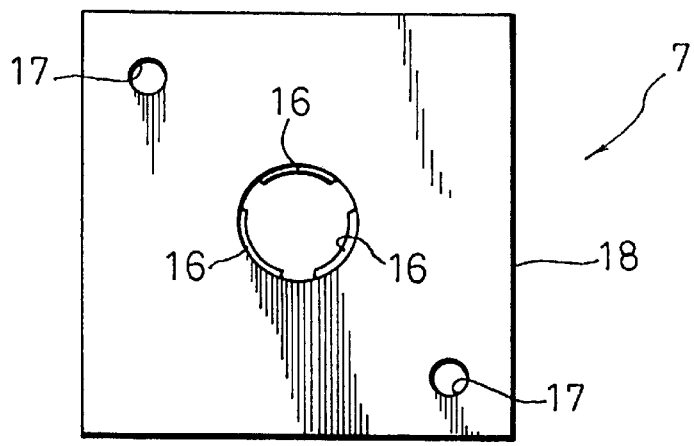
FIG. 7 is a bottom view of a nut showing the first embodiment of the present invention.
Figure 8:
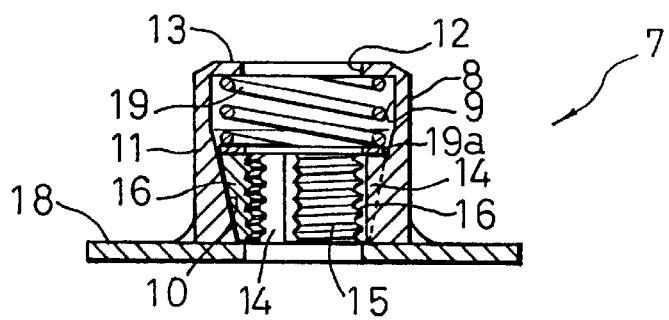
FIG. 8 is a cross-sectional view taken on line 8—8 of FIG. 4.
Figure 9:
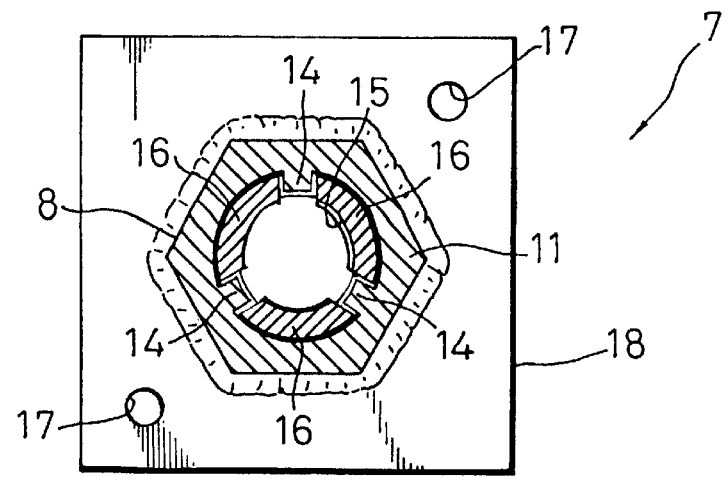
FIG. 9 is a cross-sectional view taken on line 9—9 of FIG. 4.
Figure 11:
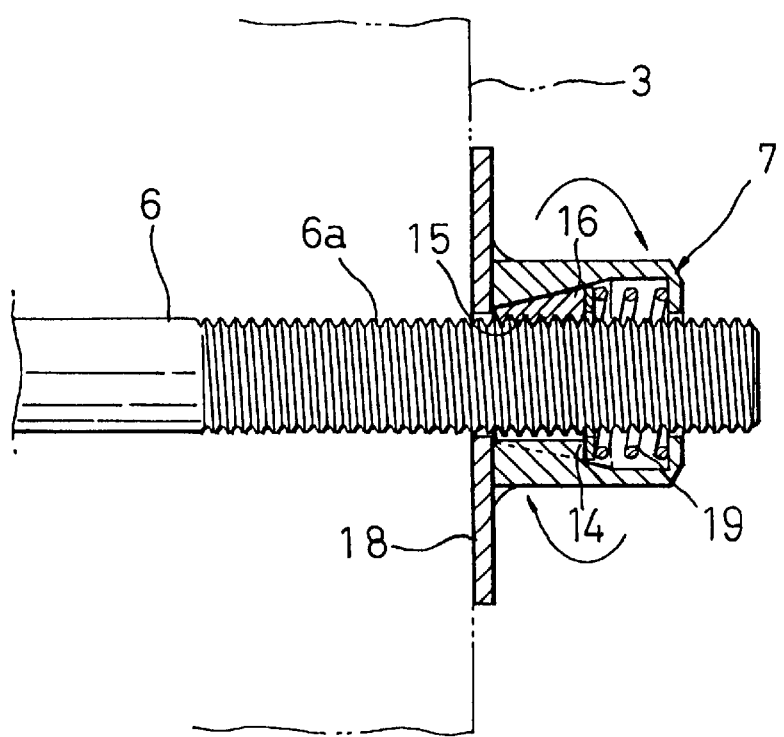
FIG. 11 is a partial cross-sectional view showing installation of the nut.
Figure 12:
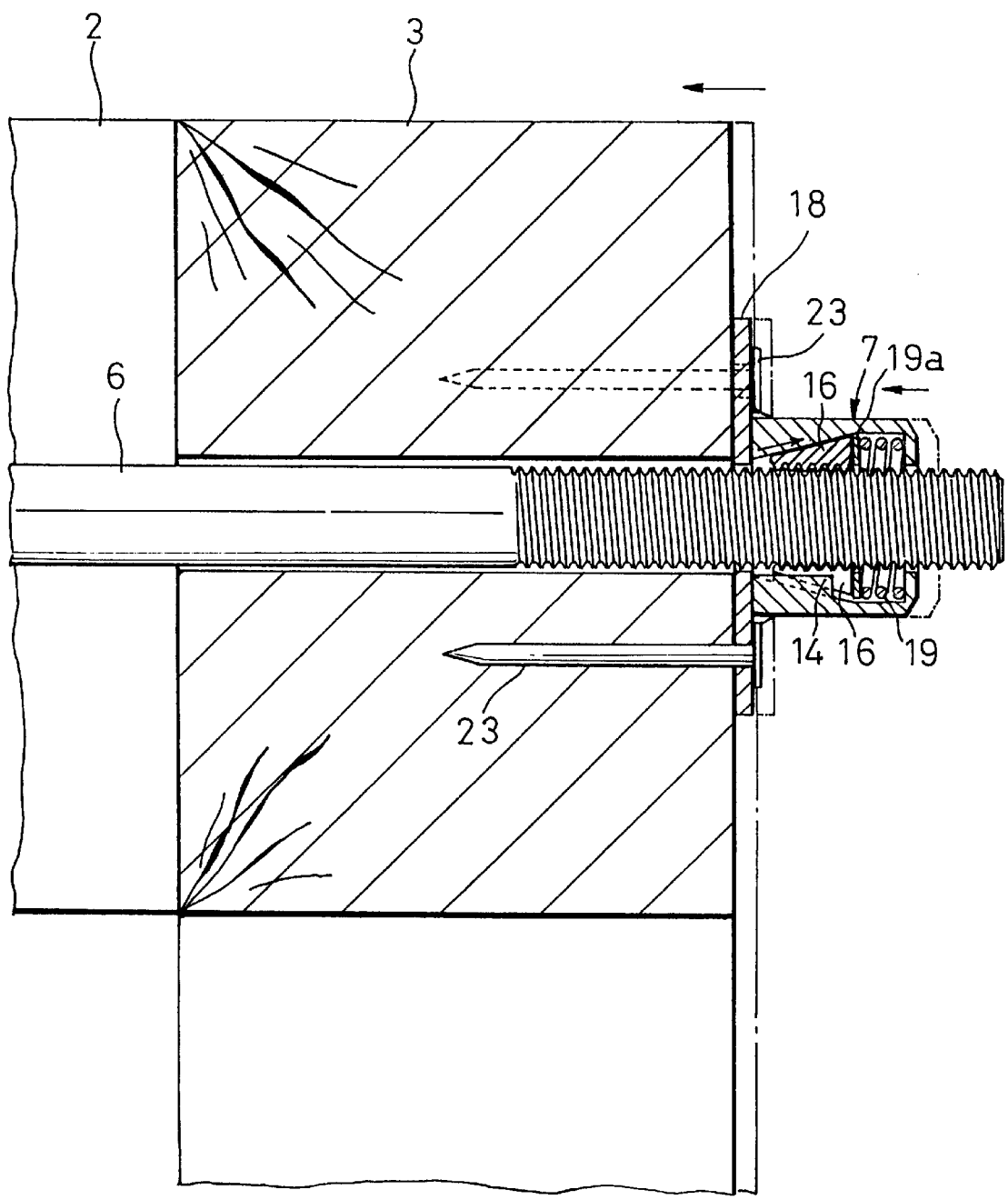
FIG. 12 is a partial cross-sectional view illustrating operation when contraction occurs.

FIGS. 11 to 12 illustrate a first embodiment of the present invention wherein a connector 1, for example shown in FIG. 1, is used for reinforcing a connection between a beam 2 and another beam 3 of a wooden house. The connector 1, shown in FIGS. 2 and 3, comprises a fitting plate 5, a bolt 6, and a nut 7 of the present invention. The fitting plate 5 is formed in the shape of an oval and has an insertion hole 4 for inserting a stopper like a bolt, nail, or the like, in a portion adjacent one end portion thereof. The bolt 6 is fixed to another end portion of the fitting plate 5. A side portion of the bolt 6 is fixed to the end portion by welding and another end portion of the bolt 6 projects outwardly. The nut 7 of the present invention can be screwed on the bolt 6 after it is pushed onto the bolt 6 to a fixed position.

Referring to FIGS. 4 to 9, the nut 7 has an outer wall 8 formed in the shape of a polygon, for example, a hexagonal shape in each embodiment of the present invention and an inner wall 9 defining a portion of a through hole. The nut 7 comprises a nut body 11 with the through hole having an inclined hole portion with an inclined inner wall extending from a small diameter end of the nut body 11 to a large diameter end at the inner wall 9. A stopper 13 is formed at an end portion of the through hole at the large diameter and defines a bolt insertion hole 12. At least three or more guideposts, for example three guideposts 14,14,14 in this embodiment, are formed coaxially at the inclined inner wall of the nut body 11. Three nut segments 16,16,16 are movably disposed among the guideposts 14,14,14 to move in a coaxial direction and have screw threads 15 on an inner wall thereof. The screw threads 15 screw onto the bolt 6. A fitting piece 18 comprises a flange fixed to the short diameter end of the nut body 11 by welding and having screw insertion holes 17,17 disposed outwardly of an outer circumferential portion of the nut body 11. The fitting piece 18 is used to fix the nut 7 to a beam. A spring 19 is located within the nut body 11 and between the stopper 13 and the three nut segments 16,16,16 to bias the nut segments 16,16,16 toward the short diameter end of the nut body 11 via a washer 19a as necessary.

Referring to FIG. 1, bolt insertion holes 20,20 are formed at a portion that is to be reinforced where first and second beams 2 and 3 are joined. After the bolt 6 is inserted into the bolt insertion hole 20 of the second beam 3, the fitting plate 5 is fixed to the first beam 2 by a bolt 21 and nut 7.

Figure 10:
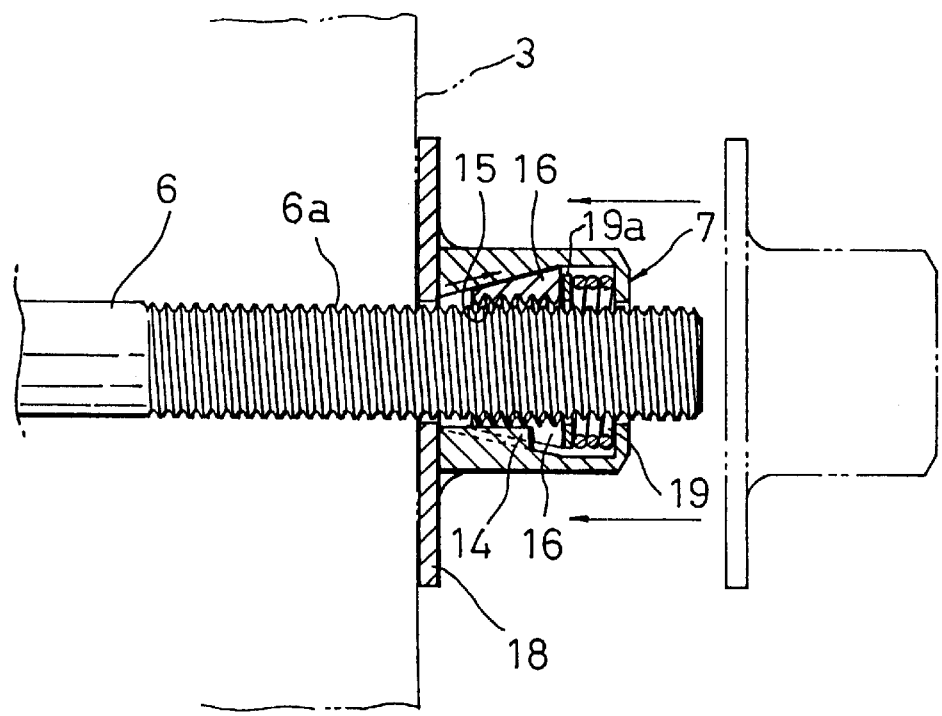
FIG. 10 is a partial cross-sectional view showing the nut mounted.

After that, as illustrated in FIG. 10, the nut 7 is pushed onto the bolt 6 to a tightening position such that the fitting piece 18 of the nut 7 is seated. When the nut 7 is pressed onto the bolt 6, the nut segments 16,16,16 slide toward the large diameter end of the inclined hole against the bias of the spring 19 to permit insertion on the bolt 6. Then the nut 7 is tightened using a tool like a wrench, or the like, as illustrated in FIG. 11. The screw threads 15,15,15 of the nut segments 16,16,16 are screwed onto the thread portion 6a of the bolt 6 and the first beam 2 is fixed to the second beam 3. After tightening, nails or screws 23,23 are driven in insertion holes 17,17 of the fitting piece 18, and the fitting piece 18 and beam 3 are fixed together. Alternatively, the fitting piece 18 may be fixed by pins in the shape of a hook.

In the above-mentioned connector 1, as illustrated in FIG. 12, the nut body 11 is fixed to the second beam 3 by nails or screws 23,23 slides due to the spring power of the spring 19 and prevents loss of tightening power when the beams 2 and 3 dry and contract.

Other embodiments of the present invention will now be described referring to FIGS. 13 to 44. Like components are denoted by like numerals as of the first embodiment and are explained in no more detail.

Figure 13:
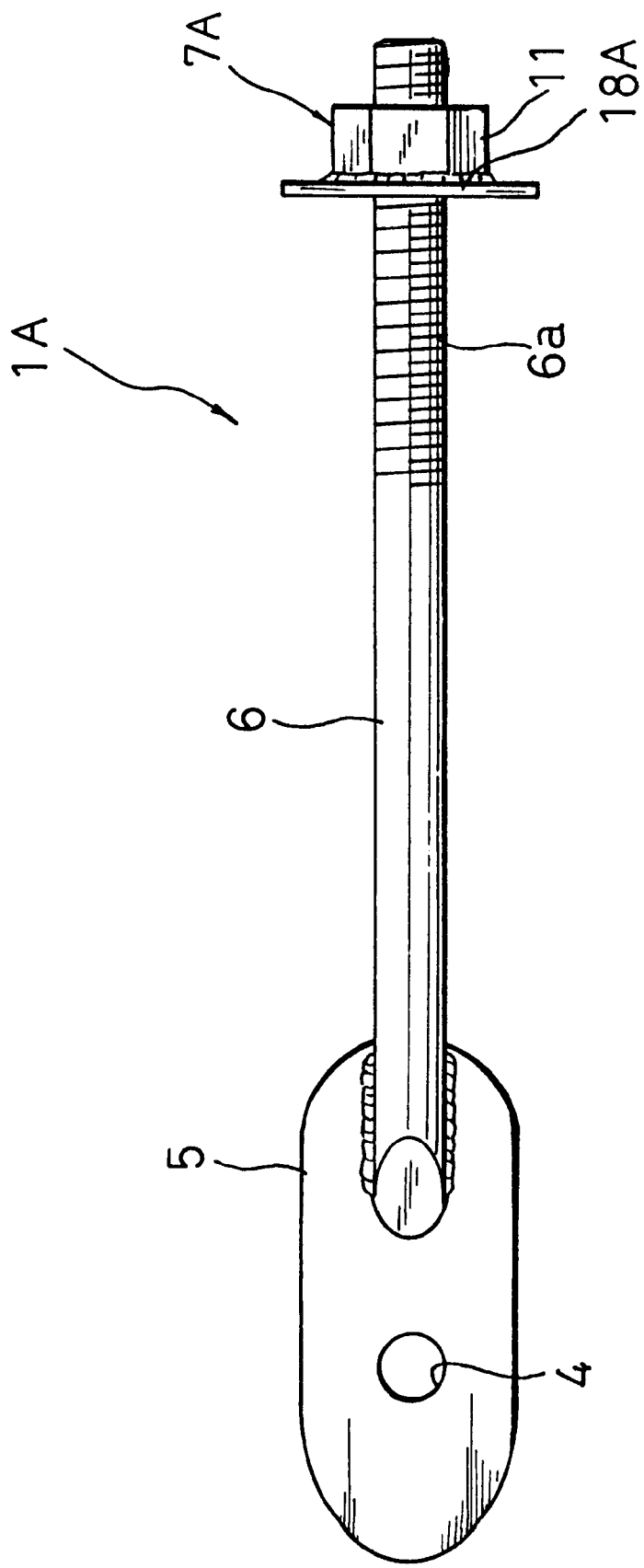
FIG. 13 is a front view showing a second embodiment of the present invention.
Figure 14:
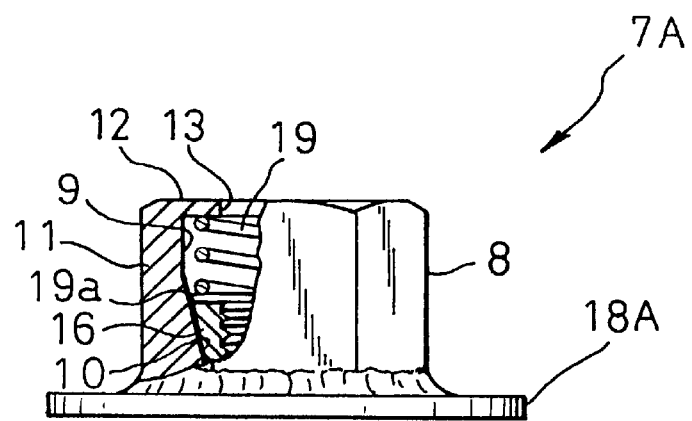
FIG. 14 is a partial cross-sectional front view of a nut according to the second embodiment of the present invention.
Figure 15:
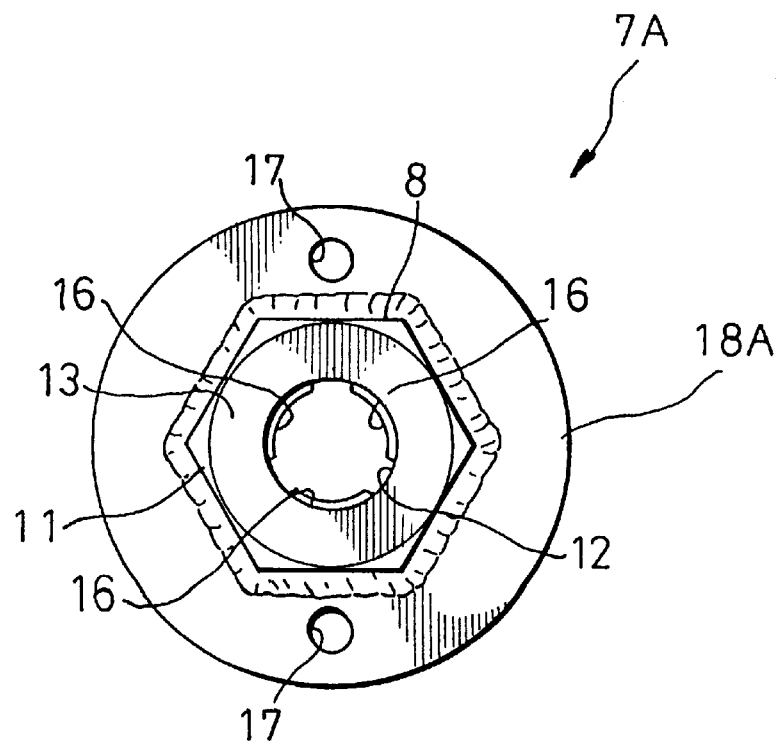
FIG. 15 is a top view of a nut of the second embodiment of the present invention.

A second embodiment of the present invention is shown in FIGS. 13 to 15. It is distinguished from the first embodiment by the fact that the nut 7 is replaced with another similar nut 7A. The nut 7A includes a fitting plate 18A formed in the shape of a disc and fixed to the nut body 11. A connector 1A with the nut 7A according to the second embodiment will have similar advantages to that according to the first embodiment.

Figure 16:
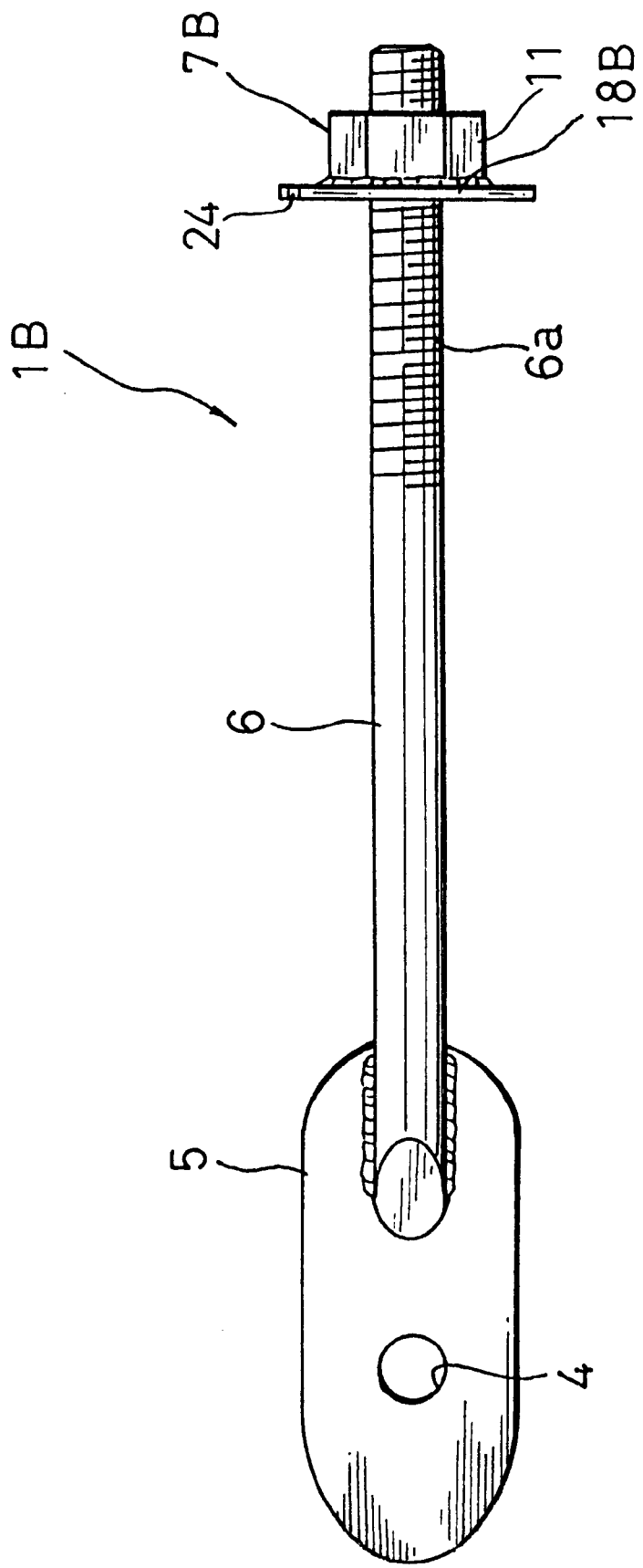
FIG. 16 is a front view showing a third embodiment of the present invention.
Figure 17:
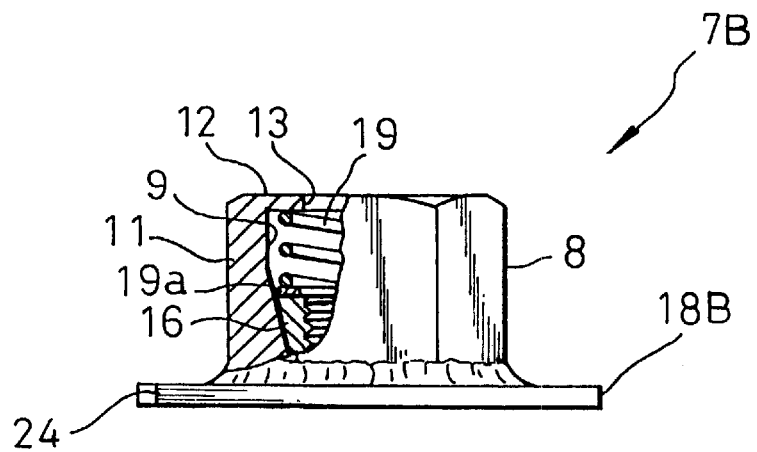
FIG. 17 is a partial cross-sectional front view of a nut according to the third embodiment of the present invention.
Figure 18:
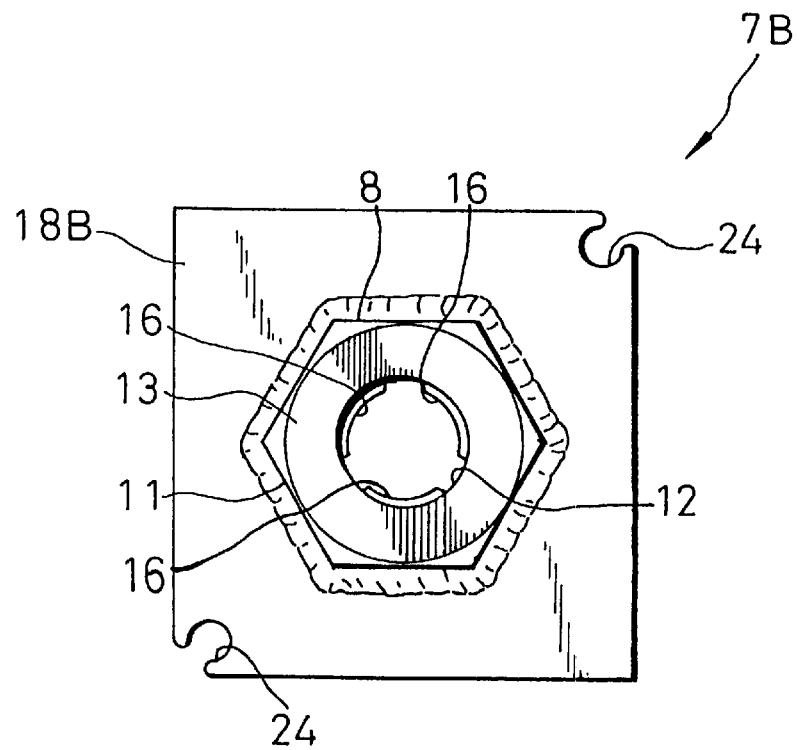
FIG. 18 is a top view of the nut of the third embodiment of the present invention.
Figure 19:
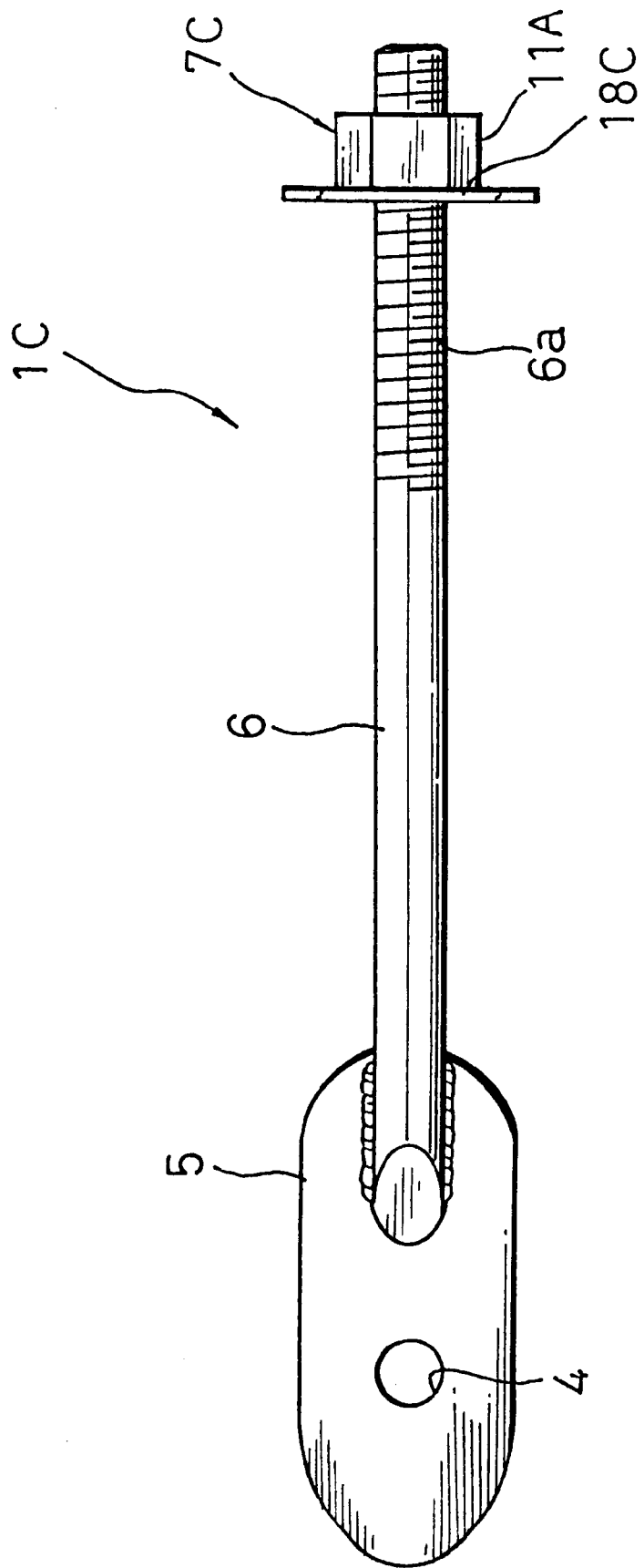
FIG. 19 is a front view showing a fourth embodiment of the present invention.
Figure 20:
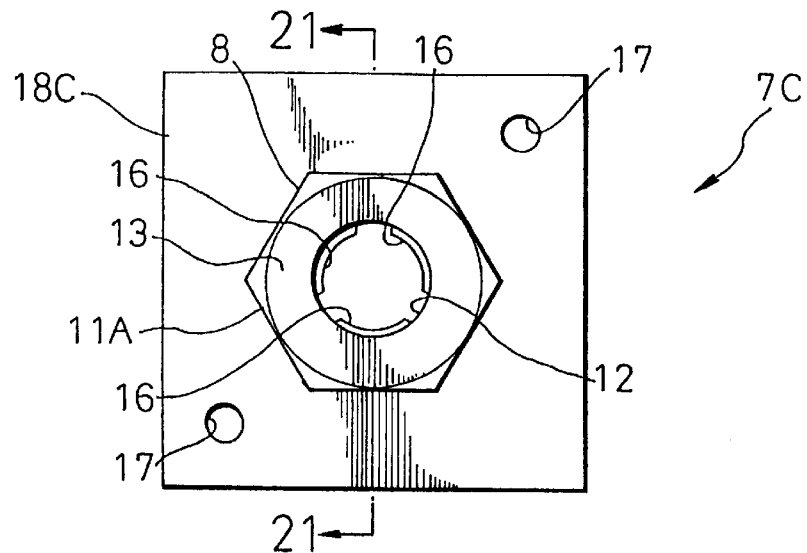
FIG. 20 is a front view of a nut of the fourth embodiment of the present invention.
Figure 21:
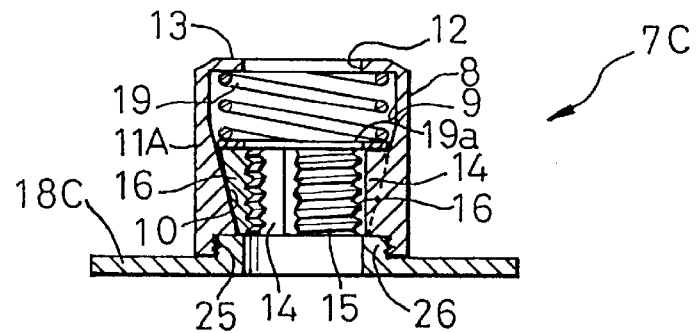
FIG. 21 is a cross-sectional view taken on line 21—21 of FIG. 20.
Figure 22:
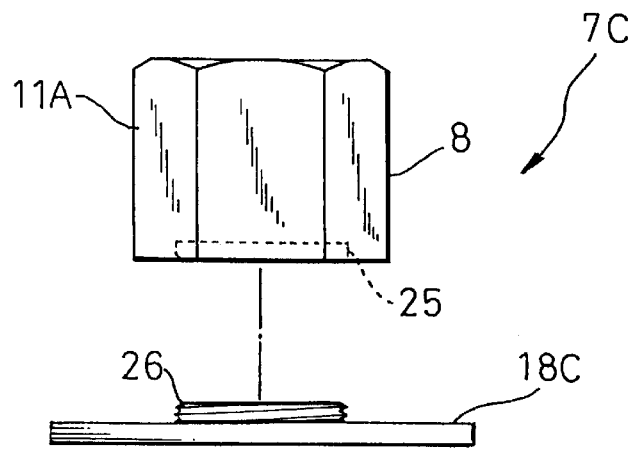
FIG. 22 is an exploded view of the nut of the fourth embodiment of the present invention.
Figure 23:
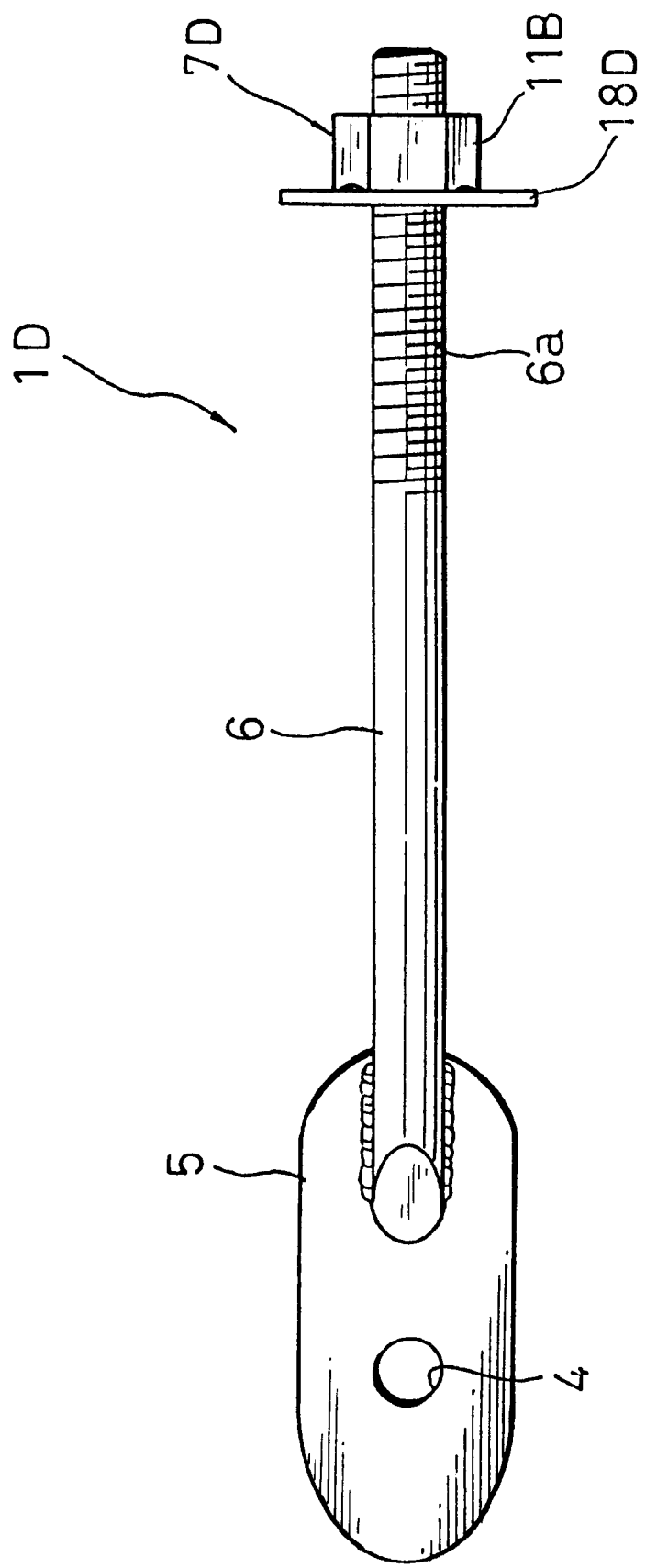
FIG. 23 is a front view showing the fourth embodiment of the present invention.
Figure 24:
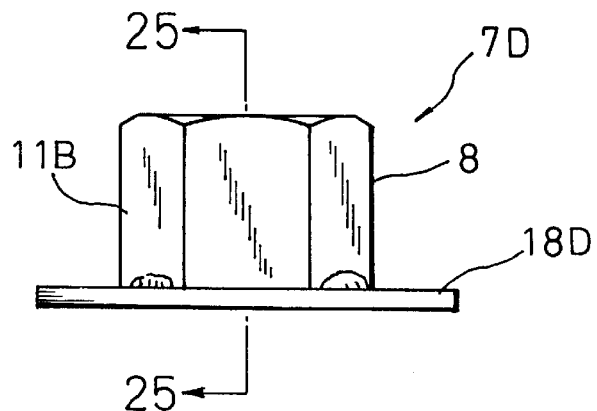
FIG. 24 is a front view of a nut showing a fifth embodiment of the present invention.
Figure 25:
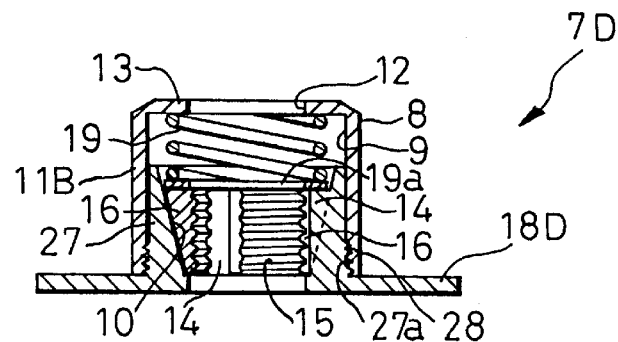
FIG. 25 is a cross-sectional view taken on line 25—25 of FIG. 24.
Figure 26:
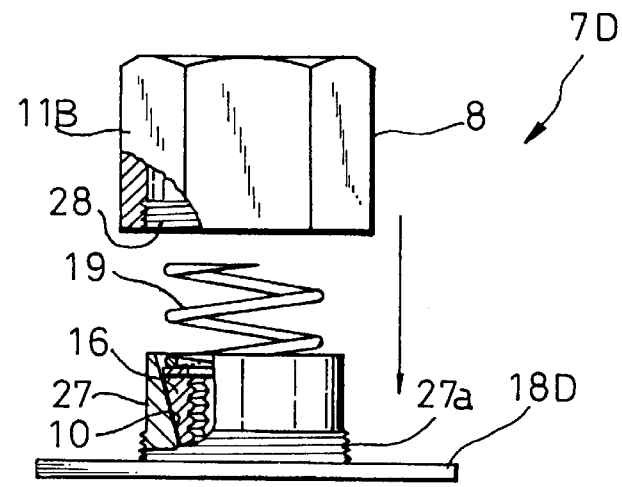
FIG. 26 is an exploded view showing the way in which the nut is grappled according to the fifth embodiment of the present invention.
Figure 27:
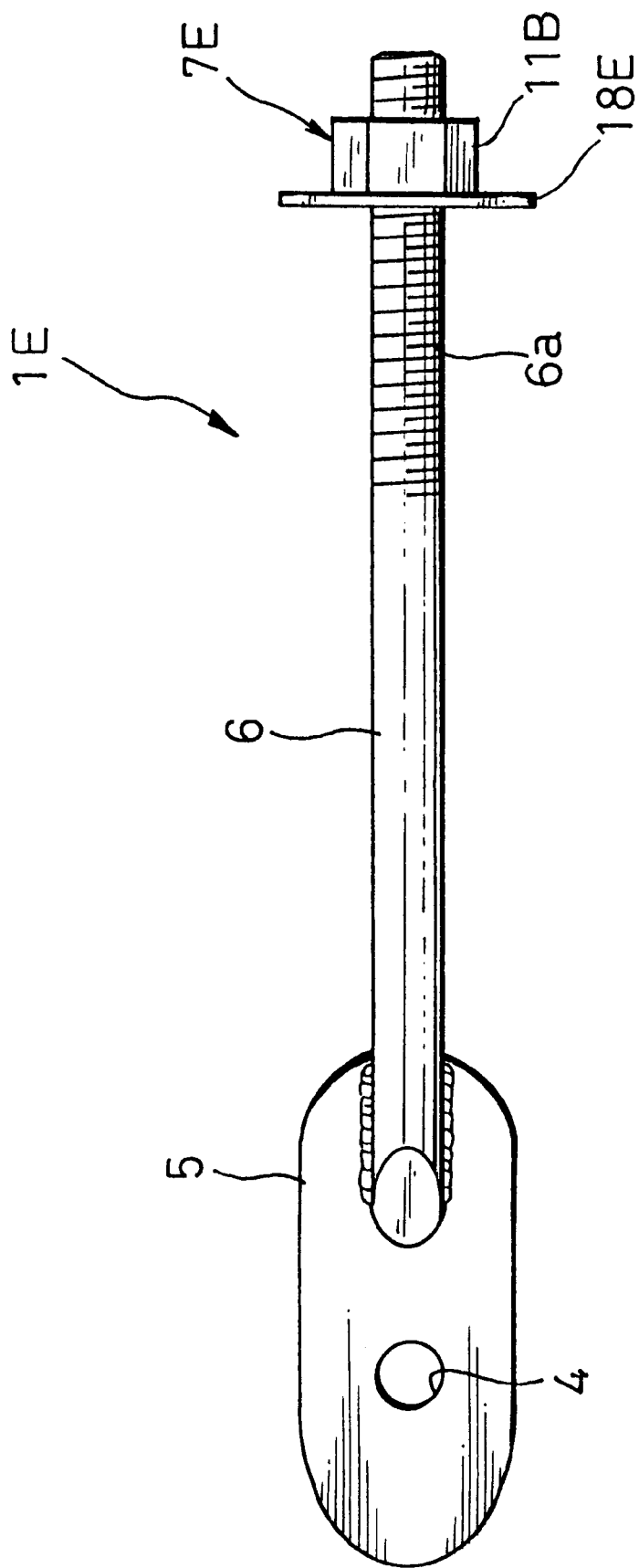
FIG. 27 is a front view showing a sixth embodiment of the present invention.
Figure 28:
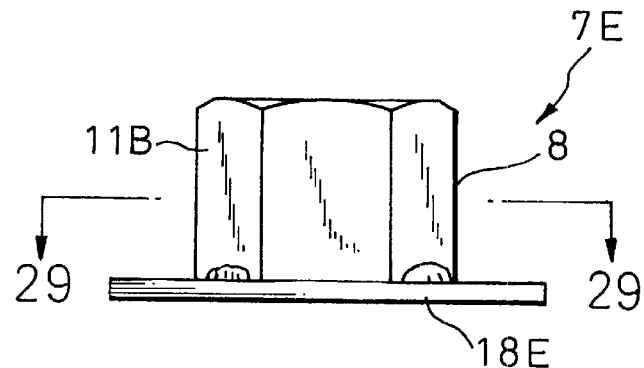
FIG. 28 is a front view of a nut of the sixth embodiment of the present invention.
Figure 29:
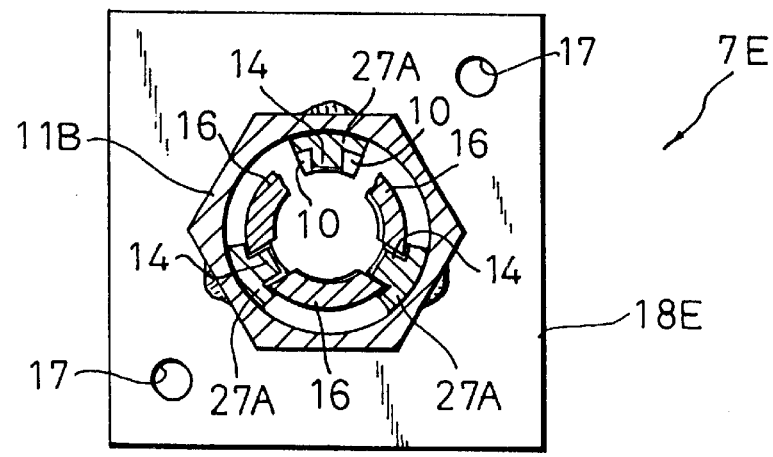
FIG. 29 is a cross-sectional view taken on line 29—29 of FIG. 28.
Figure 30:
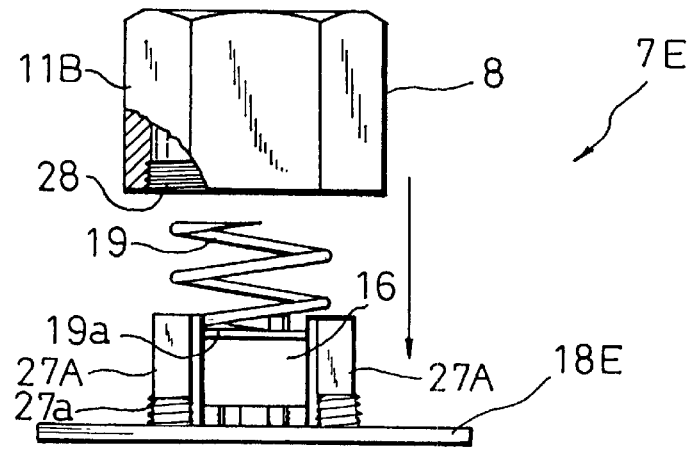
FIG. 30 is an exploded view showing the way in which the nut is grappled according to the sixth embodiment of the present invention.
Figure 31:
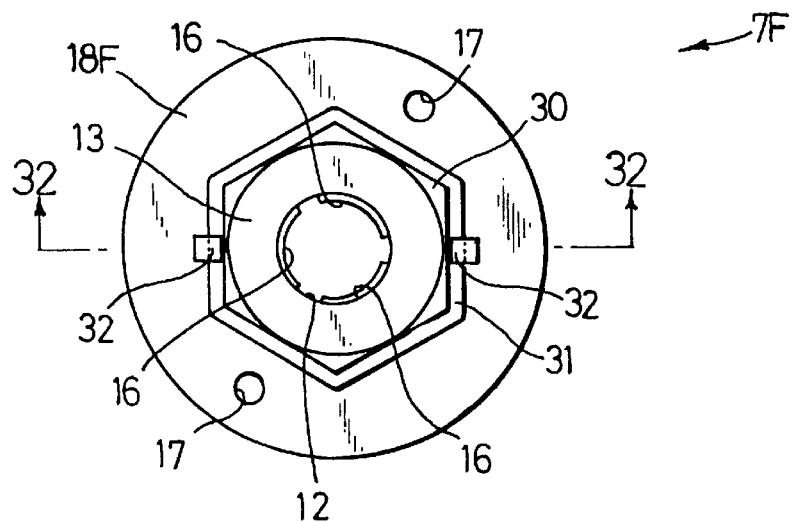
FIG. 31 is a top view showing the sixth embodiment of the present invention.
Figure 32:
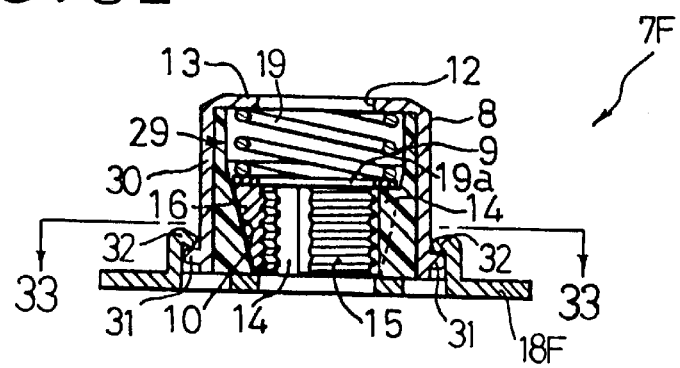
FIG. 32 is a cross-sectional view taken on line 32—32 of FIG. 31.
Figure 33:
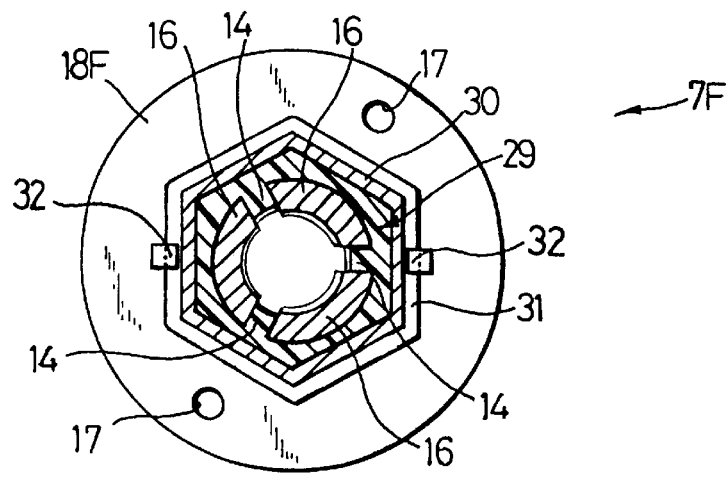
FIG. 33 is a cross-sectional view taken on line 33—33 of FIG. 32.
Figure 34:
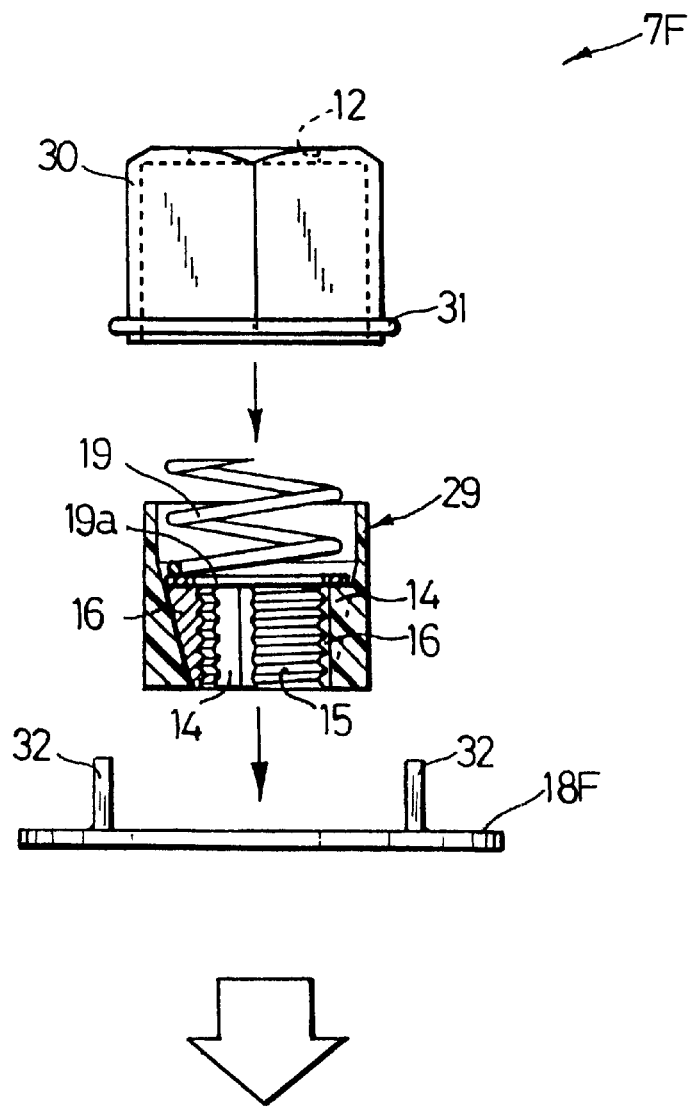
FIG. 34 is a front view showing a seventh embodiment of the present invention.
Figure 34:
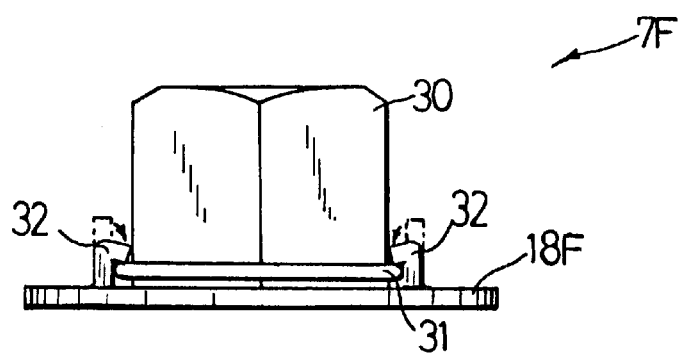

A third embodiment of the present invention is shown in FIGS. 16 to 18. It is distinguished from the first embodiment by the fact that the nut 7 is replaced with another similar nut 7B. The nut 7B includes a fitting plate 18B having screw insertion grooves 24,24 at an outer circumferential portion thereof. Such a fitting plate may be formed by molding. A connector 1B with the nut 7B according to the third embodiment will have similar advantages to that according to the first embodiment.

A fourth embodiment of the present invention is shown in FIGS. 19 to 22. It is distinguished from the first embodiment by the fact that a threaded portion 25 is formed at an inner wall surface at the short diameter end of the nut body 11A and a threaded tube 26 on a fitting piece 18C screws into the threaded portion 25. A connector 1C with the nut 7C having the fitting piece 18C screwed onto the nut body 11A according to the third embodiment will have similar advantages to that according to the first embodiment.

A fifth embodiment of the present invention is shown in FIGS. 23 to 26. It is distinguished from the first embodiment by the fact that the nut 7 is replaced with another similar nut 7D and the nut body 11 is replaced with another similar nut body 11B. The nut 7D includes a fitting plate 18D having formed integrally therewith an inclined tube 27 with a threaded portion 27a on an outer circumferential portion of a lower end thereof which supports the nut segments 16,16, 16. The nut body 11B has a threaded portion 28 which is formed in the inner wall surface of the end portion thereof and screws onto the threaded portion 27a of the inclined tube 27. A connector 1D with the nut 7D according to the fifth embodiment will have similar advantages to that according to the first embodiment and the mounting of the nut 7D can be done easily.

To reinforce the way in which the nut body 11B is screwed onto and fixed to the fitting piece 18D, the threaded portion area between the nut body 11B and fitting piece 18D may be fixed by an adhesive, welding, or the like.

A sixth embodiment of the present invention is shown in FIGS. 27 to 30. It is distinguished from the fifth embodiment by the fact that the fitting piece 18D is replaced with another similar fitting piece 18E. The fitting piece 18E is formed in a T-shape in cross-section and has the threaded portion 27a on an outer circumferential portion of a lower end thereof which supports the three nut segments 16,16,16. A connector 1E having the nut 7E with the fitting piece 18E according to the sixth embodiment will have similar advantages to that according to the fifth embodiment and its weight may be reduced.

A seventh embodiment of the present invention is shown in FIGS. 31 to 34. It is distinguished from the first embodiment by the fact that the fitting piece 18 is replaced with another similar fitting piece 18F. The fitting piece 18F includes an inner tubular member 29 which is made of synthetic resin. An outer tubular body 30 is formed in the shape of a hexagon and includes the bolt insertion hole 12. The outer tubular body 30 covers an outer circumferential portion of the inner tubular member 29. Fitting pieces 32, 32 are fitted and fixed into a flange 31 provided adjacent the end portion of the outer tubular body 30. The outer wall of the inner tubular member 29 is formed in the shape of a hexagon and has at least three or more guideposts 14,14,14. A nut 7F according to the seventh embodiment will have similar advantages to that according to the fifth embodiment.

Figure 35:
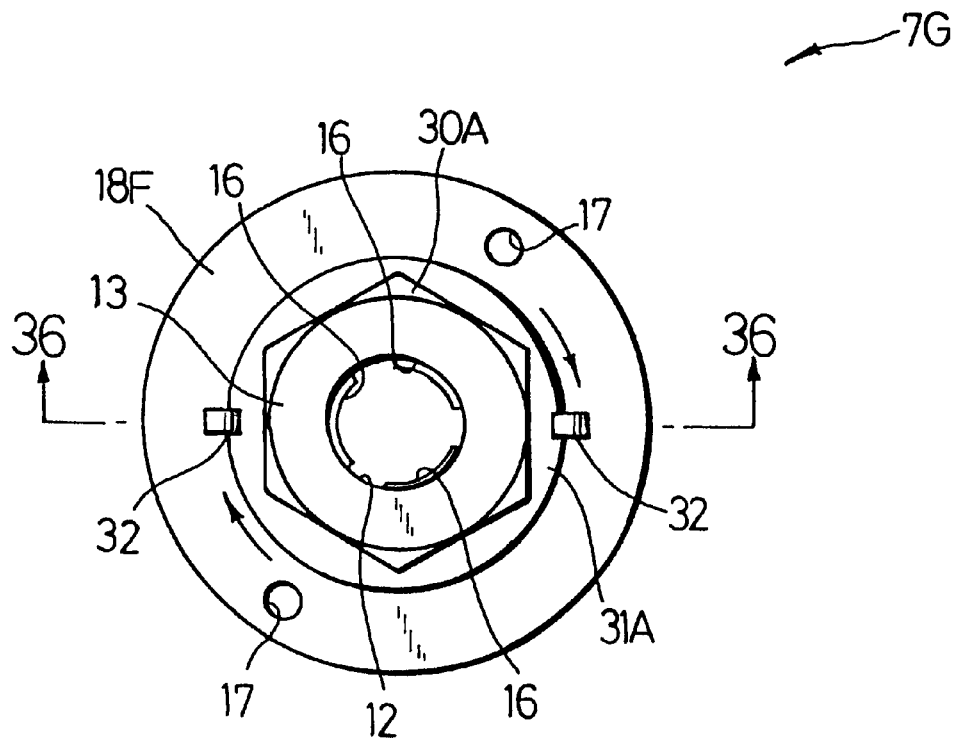
FIG. 35 is a top view showing an eighth embodiment of the present invention.
Figure 36:
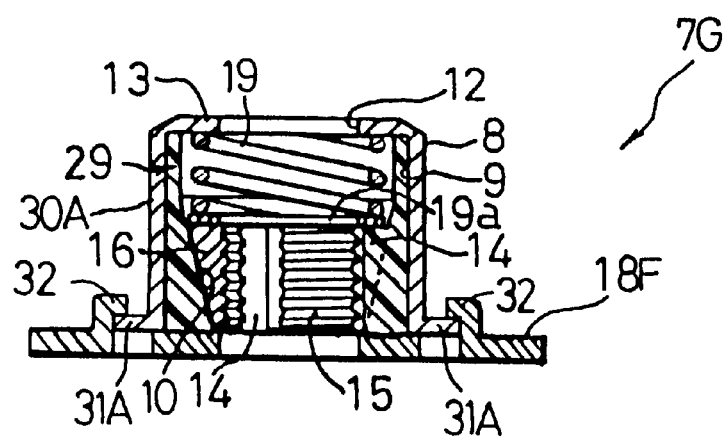
FIG. 36 is a cross-sectional view taken on line 36—36 of FIG. 35.
Figure 37:
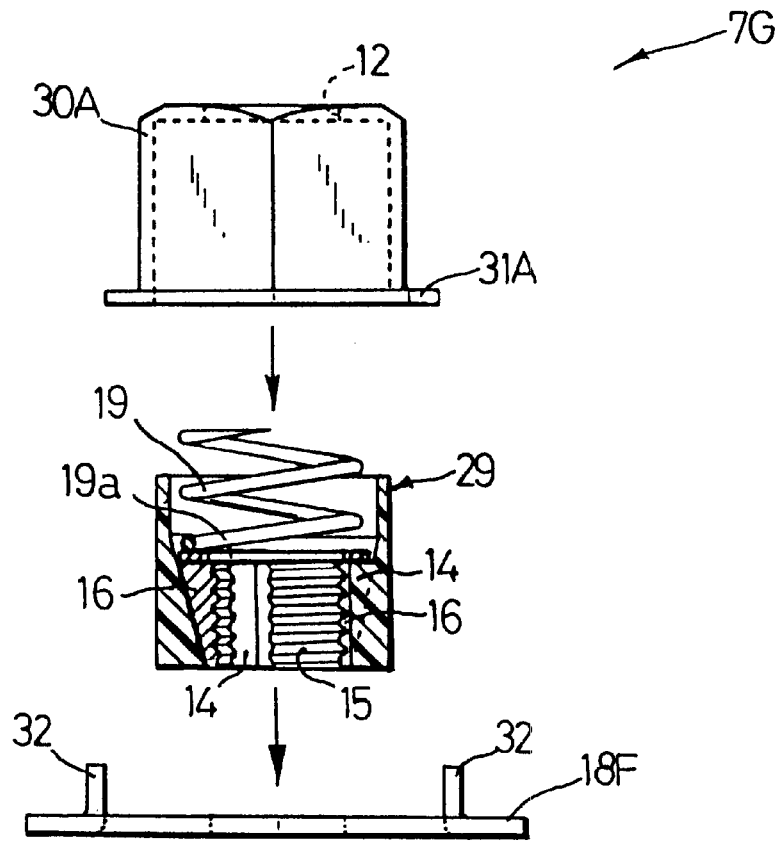
FIG. 37 is an exploded step-wise view showing an eighth embodiment of the present invention.
Figure 37:
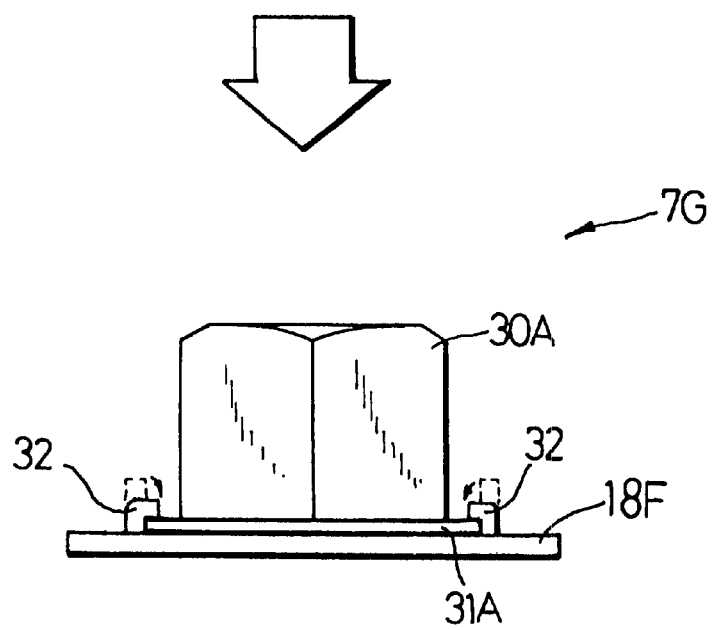
Figure 38:
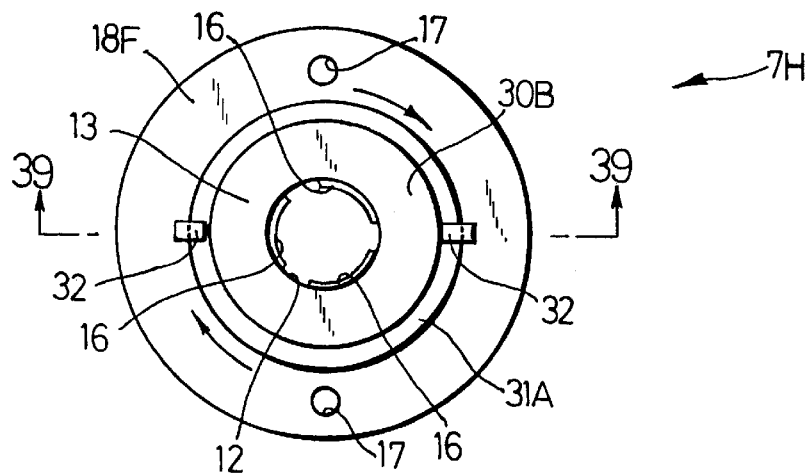
FIG. 38 is a top view showing a ninth embodiment of the present invention.
Figure 39:
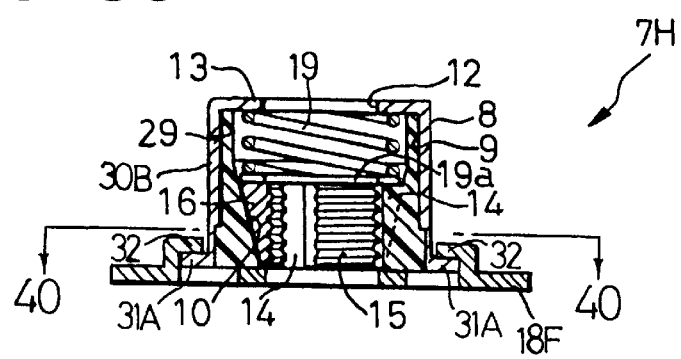
FIG. 39 is a cross-sectional view taken on line 39—39 of FIG. 38.
Figure 40:
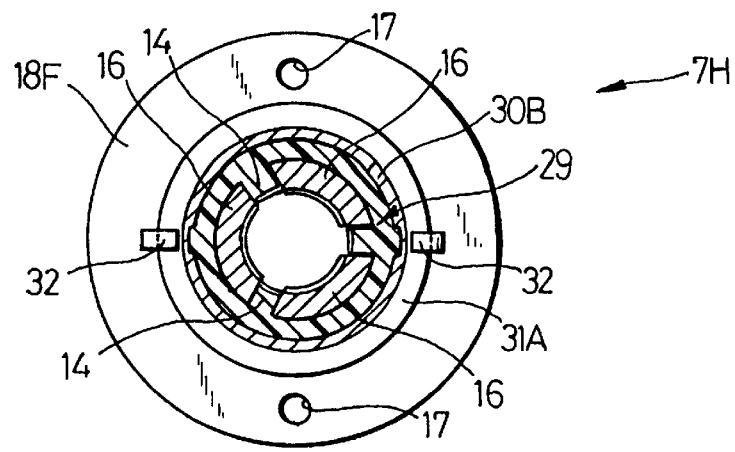
FIG. 40 is a cross-sectional view taken on line 40—40 of FIG. 39.
Figure 41:
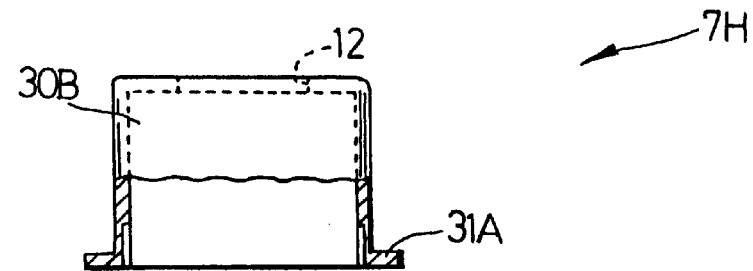
FIG. 41 is an exploded step-wise view showing the ninth embodiment of the present invention.
Figure 41:
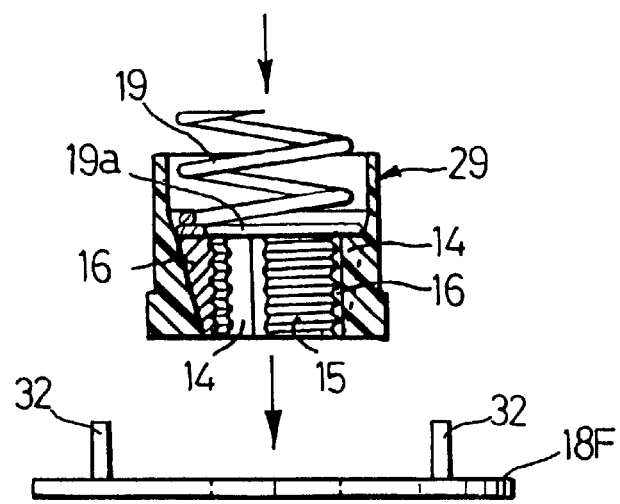
Figure 41:
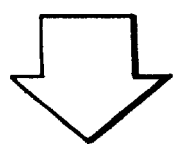
Figure 41:
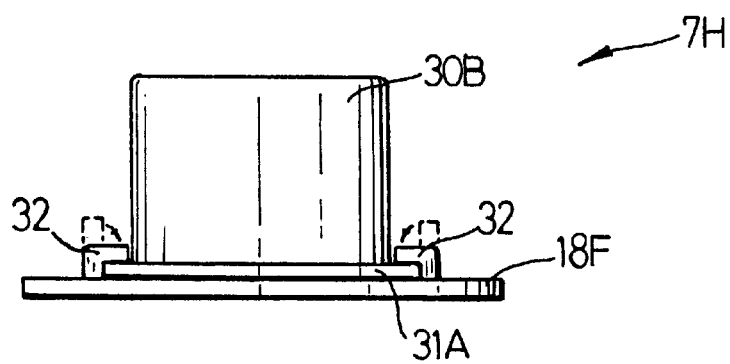

An eighth embodiment of the present invention is shown in FIGS. 35 to 37. It is distinguished from the seventh embodiment by the fact that the outer tubular body 30 is replaced with another similar tubular body 30A. The outer tubular body 30A has a flange 31A in the shape of a disc which projects outwardly at an end portion thereof. In addition, the flange 31A of the outer tubular body 30A is rotatably held by fitting pieces 32,32 of the fitting plate 18F. A nut 7G according to the eighth embodiment will have similar advantages to that according to the seventh embodiment and the outer tubular body 30A allows rotation for threading onto the bolt.

A ninth embodiment of the present invention is shown in FIGS. 38 to 41. It is distinguished from the eighth embodiment by the fact that the outer tubular body 30A is replaced with another similar tubular body 30B that has an outer circumferential portion of the outer tubular body 30B formed in the shape of a disc. A nut 7H with the outer tubular body 30B according to the ninth embodiment will have similar advantages to that according to the eighth embodiment.

Figure 42:
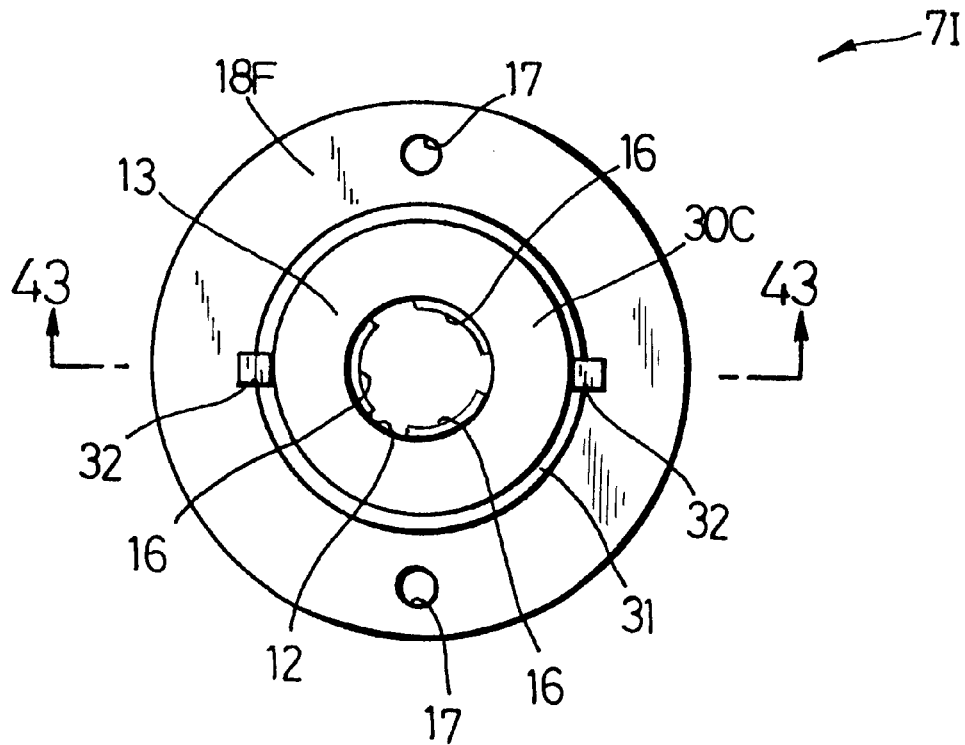
FIG. 42 is a top view showing a tenth embodiment of the present invention.
Figure 43:
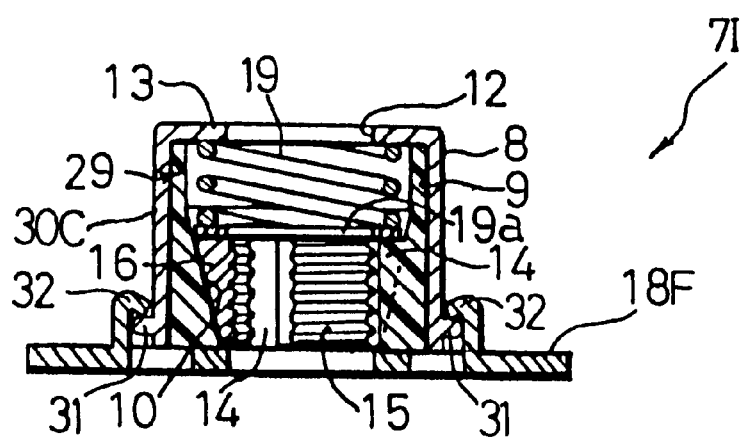
FIG. 43 is a cross-sectional view taken on line 43—43 of FIG. 42.
Figure 44:
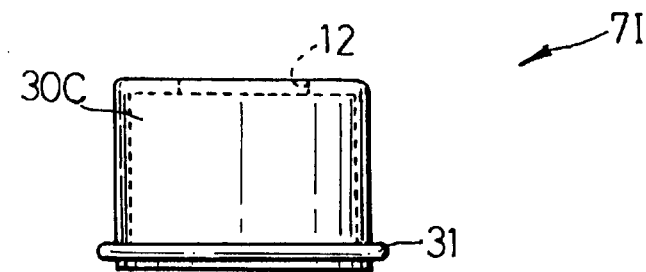
FIG. 44 is an exploded step-wise view showing the tenth embodiment of the present invention.
Figure 44:
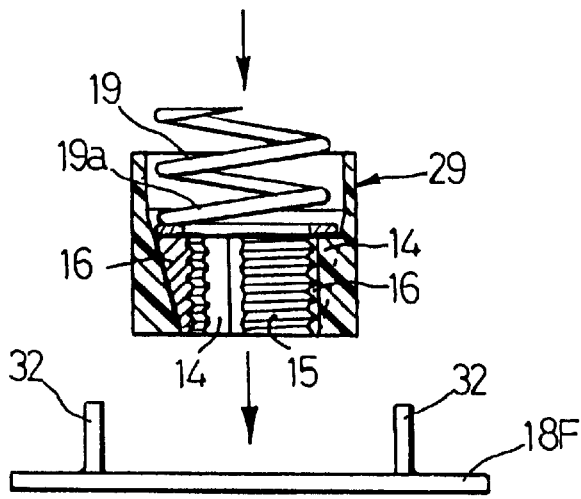
Figure 44:
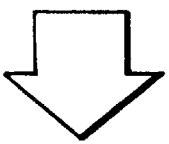
Figure 44:
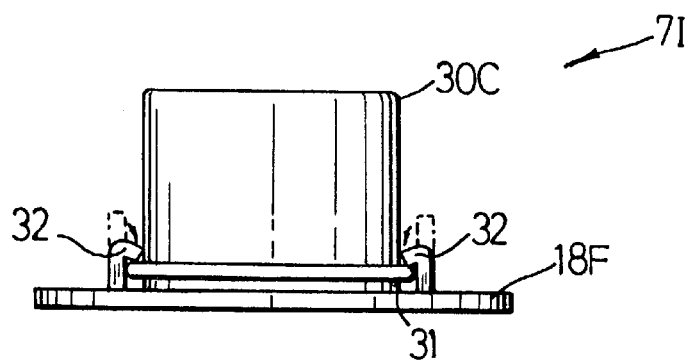

A tenth embodiment of the present invention is shown in FIGS. 42 to 44. It is distinguished from the seventh embodiment by the fact that the outer tubular body 30 is replaced with another similar tubular body 30C that has an outer circumferential portion of the outer tubular body 30C formed in the shape of a disc. A nut 7I with the outer tubular body 30C according to the tenth embodiment will have similar advantages to that according to the seventh embodiment.

Moreover, in each of the above mentioned embodiments of the present invention, the connector is explained, however, the nuts of the present invention 7, 7A, 7B, 7C, 7D, 7E, 7F, 7G, 7H, 7I may be used instead of the nut which screws onto the anchor bolt. The nuts of the present invention 7, 7A, 7B, 7C, 7D, 7E, 7F, 7G, 7H, 7I may be used on anchor bolts laid underground or other bolts.

Additionally, the nut segments similar to nut segments 16 may be provided in a number greater than three. Additionally, the nut of the present invention may be provided without three nut segments within it.

The advantages of the present invention are as follows:

(1) A nut comprises a nut body formed in the shape of a polygon at an outer wall thereof, having a hole with an inclined interior which shortens in diameter thereby establishing an angle; a stopper formed at an end portion on a long diameter side of the nut body, having a bolt insertion hole; at least three or more guideposts formed coaxially at an inner wall of the nut body; at least three or more nut segments attached movably in a coaxial direction among the guideposts, the nut segments having a screw thread which is screwed onto a bolt at the inner wall thereof; a fitting piece, which is formed in the shape of a flange, projects outwardly of an outer circumferential portion of the nut body and prevents dislodgment of at least three or more nut segments which are disposed at an end portion on a short diameter side of said nut body; and a spring disposed in the nut body such that at least the three or more nut segments are biased toward the short diameter side of the nut body to permit positioning of the nut at the tightening portion of bolt by pushing the nut onto the bolt, and the three or more nut segments allow the nut to be screwed onto the thread portion of the bolt. Therefore, it is easy to screw the nut on and labor time is reduced.

(2) As discussed in the above paragraph, the fitting piece can be fixed to the beam by screws or the like.

Therefore, even if the beam contracts in use, because the nut body pushes the movement and moves itself, and nut segments inside nut body slide, change in the holding power of the nut is prevented.

(3) As discussed in the above paragraph, because the nut segments are biased toward the short diameter side due to the spring, the nut segments can be screwed certainly onto the bolt.

What is claimed is:

1. A nut for slidable application to a bolt, comprising:

a nut body having a first end, a second end, and a through hole;

said nut body having an outer wall formed in the shape of a polygon and an inner wall defining said through hole including at least a portion thereof being an inclined wall hole having a diameter decreasing from a first diameter to a second diameter proximate said second end that is less than said first diameter;

a stopper formed as a stop flange extending radially inward into said through hole at said first end of the nut body, the stopper including said stop flange defining a bolt exit aperture of said through hole;

at least three guideposts formed coaxially on said inner wall of the nut body at said inclined wall hole and extending in a direction parallel to an axis of said through hole;

at least three nut segments having inclined outer surfaces complementing an inclination angle of said inner wall at said inclined wall hole;

said at least three nut segments being movably disposed between the guideposts so as to permit sliding movement in an axial direction and radial displacement urged by sliding engagement of said inclined outer surfaces with said inner wall at said inclined wall hole;

said at least three nut segments each having an inner surface facing said axis of said through hole, said inner surface having a screw thread for engaging a thread of said bolt;

a fitting piece, which is formed in the shape of a flange, disposed at said second end of said nut body, said fitting piece projecting outwardly of said outer wall of the nut body and extending inward of said second diameter to define a bolt insertion aperture, through which said bolt passes during application of said nut body to said bolt; and a spring disposed in the nut body between said stop flange and said at least three nut segments to bias said at least three nut segments toward said second end of said nut body.

2. The nut according to claim 1, wherein the fitting piece is fixed to said second end by one of adhesive and welding.

3. The nut according to claim 1, wherein the fitting piece has a threaded portion and said nut body has a threaded portion engaging said threaded portion of said fitting piece to secure said fitting piece at said second end of the nut body.

4. A nut for slidable application to a bolt comprising:

a tubular nut body having an outer wall formed shaped as a polygon, a first end, and a second end, said tubular nut body defining a tube cavity extending therethrough;

said tubular nut body having a stopper flange formed at said first end and defining a bolt exit aperture through which said bolt passes when said nut is slid onto said bolt;

a fitting piece, formed in the shape of a flange, fixed to said tubular nut body at said second end and extending radially inward of a perimeter of said tube cavity of the tubular nut body and extending radially outward of said outer wall of said tube body, said fitting piece defining a bolt insertion aperture through which said bolt passes when said nut is slid onto said bolt;

a sleeve disposed within said tube cavity and defining an inclined wall hole having a diameter decreasing from a first diameter to a second diameter proximate said second end that is less than said first diameter, said inclined wall hole being coaxially aligned with said bolt exit aperture and said bolt insertion aperture;

at least three guideposts formed coaxially on an inner wall of said inclined wall hole and extending in a direction parallel to an axis of said inclined wall hole;

at least three nut segments having inclined outer surfaces complementing an inclination angle of said inner wall of said inclined wall hole;

said at least three nut segments being movably disposed between the guideposts so as to permit sliding movement in an axial direction and radial displacement urged by sliding engagement of said inclined outer surfaces with said inner wall of said inclined wall hole;

said at least three nut segments having an inner surface facing said axis of said inclined wall hole, said inner surface having a screw thread for engaging a thread of said bolt; and a spring disposed in said tube cavity of the tubular nut body and between said at least three nut segments and said stop flange to bias said at least three nut segments in said axial direction toward said second end.

5. A nut for slidable application to a bolt, comprising:

a nut body having a first end, a second end, and a through hole;

said nut body having an outer wall and an inner wall defining said through hole including at least a portion thereof being an inclined wall hole having a diameter decreasing from a first diameter to a second diameter proximate said second end;

at least three guideposts formed coaxially on said inner wall of the nut body at said inclined wall hole and extending in a direction parallel to an axis of said through hole, said at least three guideposts each having a pair of side faces extending in a radial direction of said inclined wall hole;

at least three nut segments being movably disposed between opposing pairs of said side faces of said at least three guideposts;

said opposing pairs of said side faces being inclined with respect to each other along said radial direction such that a distance between said opposing pairs of side faces decreases along said radial direction toward said axis of said through hole to define an opposing face inclination angle;

said at least three nut segments having pairs of nut segment side faces inclined with respect to each other at said opposing face inclination angle such that a width of said at least three nut segments decreases radially toward said axis of said through hole so that said opposing pairs of said side faces limit movement of said at least three nut segments toward said axis in said radial direction;

said at least three nut segments having inclined outer surfaces complementing an inclination angle of said inclined wall hole such that said at least three nut segments are movably disposed between the guideposts so as to permit sliding movement in an axial direction and radial displacement urged by sliding engagement of said inclined outer surfaces with said inner wall at said inclined wall hole;

said at least three nut segments each having an inner surface facing said axis of said through hole, said inner surface having a portion of a screw thread for engaging a thread of said bolt;

a stop flange extending radially inward into said through hole at said first end of said nut body; and a bias device disposed in the nut body between said stop flange and said at least three nut segments to bias said at least three nut segments toward said second end of said nut body and thereby urge said at least three nut segments radial inward by sliding engagement of said inclined outer surfaces with said inner wall at said inclined wall hole.

6. The nut according to claim 5, further comprising a fitting piece fixed to said second end by one of adhesive and welding, said fitting piece projecting outwardly of said outer wall of the nut body and extending inward of said second diameter to define a bolt insertion aperture, through which said bolt passes during application of said nut body to said bolt.

7. The nut according to claim 5, further comprising:

a fitting piece having a threaded portion and said nut body having a threaded portion engaging said threaded portion of said fitting piece to secure said fitting piece at said second end of the nut body; and said fitting piece projecting outwardly of said outer wall of the nut body and extending inward of said second diameter to define a bolt insertion aperture, through which said bolt passes during application of said nut body to said bolt.

8. The nut according to claim 5, wherein said stop flange defines a bolt exit aperture through which said bolt passes during application of said nut body to said bolt.

9. A nut for slidable application to a bolt comprising:

a tubular nut body having an outer wall, a first end, and a second end, said tubular nut body defining a tube cavity extending therethrough;

said tubular nut body having a stopper flange formed at said first end and extending radially inwardly into said tube cavity;

a fitting piece, formed in the shape of a flange, mounted to said tubular nut body at said second end and extending radially inward of a perimeter of said tube cavity of the tubular nut body, said fitting piece defining a bolt insertion aperture through which said bolt passes when said nut is slid onto said bolt;

a sleeve disposed within said tube cavity and defining an inclined wall hole having a diameter decreasing from a first diameter to a second diameter proximate said second end that is less than said first diameter, said inclined wall hole being coaxially aligned with an axis of said tube cavity;

at least three guideposts formed coaxially on said inclined wall hole and extending in a direction parallel to an axis of said tube cavity, said at least three guideposts each having a pair of side faces extending in a radial direction of said inclined wall hole;

at least three nut segments being movably disposed between opposing pairs of said side faces of said at least three guideposts;

said opposing pairs of said side faces being inclined with respect to each other along said radial direction such that a distance between said opposing pairs of side faces decreases along said radial direction toward said axis of said through hole to define an opposing face inclination angle;

said at least three nut segments having pairs of nut segment side faces inclined with respect to each other at said opposing face inclination angle such that a width of said at least three nut segments decreases radially toward said axis of said tube cavity so that said opposing pairs of said side faces limit movement of said at least three nut segments toward said axis in said radial direction;

said at least three nut segments having inclined outer surfaces complementing an inclination angle of said inclined wall hole such that said at least three nut segments are movably disposed between the guideposts so as to permit sliding movement in an axial direction and radial displacement urged by sliding engagement of said inclined outer surfaces with said inner wall at said inclined wall hole;

said at least three nut segments each having an inner surface facing said axis of said tube cavity, said inner surface having a portion of a screw thread for engaging a thread of said bolt; and a bias device disposed in said tube cavity of the tubular nut body and between said at least three nut segments and said stop flange to bias said at least three nut segments in said axial direction toward said second end to effect said radial displacement urged by sliding engagement of said inclined outer surfaces with said inner wall at said inclined wall hole.

10. The nut according to claim 9 wherein said fitting piece extends radially outward of a perimeter of said tube cavity of the tubular nut body to form a fitting flange.

11. The nut according to claim 10 wherein said fitting flange has at least one aperture for accepting a fastener therethrough.

12. The nut according to claim 9 wherein:

said tubular nut body has a disc shaped annular flange extending radially outward therefrom at said second end;

said fitting piece having said tubular nut body rotatably mounted thereon so as to permit rotation about said axis; and said fitting piece extends radially outward of a perimeter of said tube cavity of the tubular nut body to form a fitting flange.

13. The nut according to claim 12 wherein said fitting flange has at least one aperture for accepting a fastener therethrough.

14. A connector kit for connecting a first beam to a second beam with an end of said first beam facing a first side of said second beam, wherein a first fastener is to be inserted into a side of said first beam, at least one second fastener is to be inserted into a second side of said second beam opposite said first side of said second beam, and a bolt hole is to be provided in said second beam extending through said first side and said second side, the connector kit comprising:

a bolt having a threaded portion at a first end and a flange at a second end wherein said bolt is for passing through said bolt hole from said first side of said second beam to extend said threaded portion from said second side of said second beam;

said flange having an aperture for accepting said first fastener to hold said flange against said first side of said first beam; and a nut device for slidable application to said bolt onto said threaded portion to a position abutting said second side of said second beam, said nut device including:

a nut body having a first end, a second end, and a through hole;

said nut body having an outer wall and an inner wall defining said through hole including at least a portion thereof being an inclined wall hole having a diameter decreasing from a first diameter to a second diameter proximate said second end;

at least three guideposts formed coaxially on said inner wall of the nut body at said inclined wall hole and extending in a direction parallel to an axis of said through hole, said at least three guideposts each having a pair of side faces extending in a radial direction of said inclined wall hole;

at least three nut segments being movably disposed between opposing pairs of said side faces of said at least three guideposts;

said opposing pairs of said side faces being inclined with respect to each other along said radial direction such that a distance between said opposing pairs of side faces decreases along said radial direction toward said axis of said through hole to define an opposing face inclination angle;

said at least three nut segments having pairs of nut segment side faces inclined with respect to each other at said opposing face inclination angle such that a width of said at least three nut segments decreases radially toward said axis of said through hole so that said opposing pairs of said side faces limit movement of said at least three nut segments toward said axis in said radial direction;

said at least three nut segments having inclined outer surfaces complementing an inclination angle of said inclined wall hole such that said at least three nut segments are movably disposed between the guideposts so as to permit sliding movement in an axial direction and radial displacement urged by sliding engagement of said inclined outer surfaces with said inner wall at said inclined wall hole;

said at least three nut segments each having an inner surface facing said axis of said through hole, said inner surface having a portion of a screw thread for engaging said threaded portion of said bolt;

a stop flange extending radially inward into said through hole at said first end of said nut body;

a bias device disposed in the nut body between said stop flange and said at least three nut segments to bias said at least three nut segments toward said second end of said nut body and thereby urge said at least three nut segments radial inward by sliding engagement of said inclined outer surfaces with said inner wall at said inclined wall hole to effect engagement of said portions of said screw thread with said threaded portion of said bolt, and to permit outward radial displacement of said at least three nut segments by action of said threaded portion against said bias device thereby allowing slidable application of said nut device to said threaded portion of said bolt when said nut device is slid onto said bolt with said second end of said nut body leading;

a fitting piece mounted to said second end of said nut body, said fitting piece projecting outwardly of said outer wall of the nut body to form a fitting flange and extending inward of said second diameter to define a bolt insertion aperture, through which said bolt passes during application of said nut body to said bolt; and said fitting flange having at least one fastener aperture for accepting said at least one second fastener therethrough to fasten said fitting flange to said second side of said second beam.

15. The kit according to claim 14, wherein said stop flange defines a bolt exit aperture through which said bolt passes during application of said nut device to said bolt.

16. A connector kit for connecting a first beam to a second beam with an end of said first beam facing a first side of said second beam, wherein a first fastener is to be inserted into a side of said first beam, at least one second fastener is to be inserted into a second side of said second beam opposite said first side of said second beam, and a bolt hole is to be provided in said second beam extending through said first side and said second side, the connector kit comprising:

a bolt having a threaded portion at a first end and a flange at a second end wherein said bolt is for passing through said bolt hole from said first side of said second beam to extend said threaded portion from said second side of said second beam;

said flange having an aperture for accepting said first fastener to hold said flange against said first side of said first beam; and a nut device for slidable application to said bolt onto said threaded portion to a position abutting said second side of said second beam, said nut device including:

a tubular nut body having an outer wall, a first end, and a second end, said tubular nut body defining a tube cavity extending therethrough;

said tubular nut body having a stopper flange formed at said first end and extending radially inwardly into said tube cavity;

a fitting piece, formed in the shape of a flange, mounted to said tubular nut body at said second end and extending radially inward of a perimeter of said tube cavity of the tubular nut body, said fitting piece defining a bolt insertion aperture through which said bolt passes when said nut is slid onto said bolt;

a sleeve disposed within said tube cavity and defining an inclined wall hole having a diameter decreasing from a first diameter to a second diameter proximate said second end that is less than said first diameter, said inclined wall hole being coaxially aligned with an axis of said tube cavity;

at least three guideposts formed coaxially on said inclined wall hole and extending in a direction parallel to an axis of said tube cavity, said at least three guideposts each having a pair of side faces extending in a radial direction of said inclined wall hole;

at least three nut segments being movably disposed between opposing pairs of said side faces of said at least three guideposts;

said opposing pairs of said side faces being inclined with respect to each other along said radial direction such that a distance between said opposing pairs of side faces decreases along said radial direction toward said axis of said through hole to define an opposing face inclination angle;

said at least three nut segments having pairs of nut segment side faces inclined with respect to each other at said opposing face inclination angle such that a width of said at least three nut segments decreases radially toward said axis of said tube cavity so that said opposing pairs of said side faces limit movement of said at least three nut segments toward said axis in said radial direction;

said at least three nut segments having inclined outer surfaces complementing an inclination angle of said inclined wall hole such that said at least three nut segments are movably disposed between the guideposts so as to permit sliding movement in an axial direction and radial displacement urged by sliding engagement of said inclined outer surfaces with said inner wall at said inclined wall hole;

said at least three nut segments each having an inner surface facing said axis of said tube cavity, said inner surface having a portion of a screw thread for engaging said threaded portion of said bolt when said nut device is slid onto said threaded portion with said second end of said tubular nut body leading;

a bias device disposed in said tube cavity of the tubular nut body and between said at least three nut segments and said stop flange to bias said at least three nut segments in said axial direction toward said second end to effect said radial displacement urged by sliding engagement of said inclined outer surfaces with said inner wall at said inclined wall hole, and to permit outward radial displacement to permit said nut device to slide over said threaded portion when said nut device is slid onto said threaded portion with said second end of said tubular nut body leading; and said fitting piece extending radially outward from said tubular nut body to form a fitting flange with at least one fastener aperture for accepting said at least one second fastener therethrough to permit securing said fitting flange to said second side of said second beam when said nut device is slid onto said threaded portion to abut said fitting flange against said second side.

17. The kit according to claim 16 wherein:

said tubular nut body has a disc shaped annular flange extending radially outward therefrom at said second end; and said fitting piece having said tubular nut body rotatably mounted thereon so as to permit rotation about said axis thereby permitting tightening of said nut device on said threaded portion after said fitting flange is secured to said second side of said second beam.

* * * * *